US012609333B2

(12) United States Patent
Rewers et al.

(10) Patent No.: US 12,609,333 B2
(45) Date of Patent: Apr. 21, 2026

(54) FUEL CELL SYSTEM WITH A VENTILATION LINE AND/OR A COMPRESSOR VENTILATION LINE, METHOD FOR VENTILATING A HOUSING OF A FUEL CELL SYSTEM AND VEHICLE

(71) Applicant: Robert Bosch GmbH, Stuttgart (DE)

(72) Inventors: Gregory Rewers, Schwieberdingen (DE); Harald Schmeisser, Stuttgart (DE); Werner Belschner, Michelbach an der Bilz (DE); Markus Remlinger, Miesbach (DE); Uwe Hammer, Rosenheim (DE)

(73) Assignee: Robert Bosch GmbH, Stuttgart (DE)

( * ) Notice: Subject to any disclaimer, the term of this patent is extended or adjusted under 35 U.S.C. 154(b) by 1029 days.

(21) Appl. No.: 17/620,925

(22) PCT Filed: Jun. 12, 2020

(86) PCT No.: PCT/EP2020/066266
§ 371 (c)(1),
(2) Date: Jan. 31, 2022

(87) PCT Pub. No.: WO2020/260035
PCT Pub. Date: Dec. 30, 2020

(65) Prior Publication Data
US 2022/0352530 A1     Nov. 3, 2022

(30) Foreign Application Priority Data

Jun. 26, 2019     (DE) ..................... 10 2019 209 210.1

(51) Int. Cl.
H01M 8/04007 (2016.01)
H01M 8/04014 (2016.01)
(Continued)

(52) U.S. Cl.
CPC ... H01M 8/04014 (2013.01); H01M 8/04074 (2013.01); H01M 8/04126 (2013.01);
(Continued)

(58) Field of Classification Search
CPC ......... H01M 8/04111; H01M 8/04164; H01M 8/0618; H01M 8/04074; H01M 8/04425;
(Continued)

(56) References Cited

U.S. PATENT DOCUMENTS

2001/0015299 A1     8/2001   Moore
2003/0203258 A1*   10/2003   Yang ................. H01M 8/04097
                                                                    429/444
(Continued)

FOREIGN PATENT DOCUMENTS

CN          201117720 Y       9/2008
CN          101981746 A       2/2011
(Continued)

OTHER PUBLICATIONS

Machine translation of Fukuma et al., corresponding to JP-2013037836-A as cited in the Dec. 20, 2021 IDS (Year: 2013).*

(Continued)

*Primary Examiner* — Jessie Walls-Murray
(74) *Attorney, Agent, or Firm* — Michael Best & Friedrich LLP

(57) ABSTRACT

The invention relates to a fuel cell system (100) with at least one fuel cell (90), each fuel cell (90) having a cathode inlet (92), and with a housing (50) in which the at least one fuel cell (90) is arranged, the housing (50) having at least one ventilation inlet (52) through which at least one ventilation fluid flows in and at least one outflow outlet (54) through which at least one outflow fluid flows out. The fuel cell system (100) further comprises a supply line (14) to the at least one cathode inlet (92) for providing a supply fluid from
(Continued)

a first fluid source to the at least one cathode inlet (14), and a compressor (16) in the supply line (14) for compressing the supply fluid. The fuel cell system (100) also comprises a fluidly communicating ventilation line (24) between the supply line (14) and the at least one ventilation inlet (52) for connecting the supply line (14) to the at least one ventilation line (52), the fluidly communicating ventilation line (24) being connected to the supply line (14) between the compressor (16) and the at least one cathode inlet (92), and/or a compressor cooling line (32) for cooling the compressor (16) and a fluidly communicating compressor ventilation line (34) between the compressor cooling line (32) and the at least one ventilation inlet (52) for connecting the compressor cooling line (32) to the at least one ventilation inlet (52).

12 Claims, 16 Drawing Sheets

(51) Int. Cl.
  *H01M 8/04082* (2016.01)
  *H01M 8/04119* (2016.01)
  *H01M 8/0438* (2016.01)
  *H01M 8/2475* (2016.01)
(52) U.S. Cl.
  CPC ... *H01M 8/04201* (2013.01); *H01M 8/04425* (2013.01); *H01M 8/2475* (2013.01); *H01M 2250/20* (2013.01)
(58) Field of Classification Search
  CPC .......... H01M 8/2475; H01M 8/04126; H01M 8/04492; H01M 8/04828; H01M 8/04014; H01M 8/04231; H01M 8/04201; H01M 8/04395; H01M 8/04007; H01M 8/0435; H01M 8/0267; H01M 8/04335; H01M 8/04507; H01M 8/04708; H01M 8/04798
  See application file for complete search history.

(56) References Cited

U.S. PATENT DOCUMENTS

| | | | | |
|---|---|---|---|---|
| 2004/0265654 | A1* | 12/2004 | Imaseki | H01M 8/04074 429/513 |
| 2005/0001474 | A1 | 1/2005 | Zierolf | |

| | | | | |
|---|---|---|---|---|
| 2005/0037250 | A1* | 2/2005 | Gunther | H01M 8/04014 429/434 |
| 2005/0058861 | A1* | 3/2005 | Pettit | H01M 8/04014 429/441 |
| 2006/0169024 | A1* | 8/2006 | Shoji | H01M 8/0447 73/23.2 |
| 2006/0263651 | A1* | 11/2006 | Fagley | H01M 8/04835 429/430 |
| 2007/0072016 | A1* | 3/2007 | St-Pierre | H01M 8/04395 429/429 |
| 2008/0193887 | A1* | 8/2008 | Hamada | F23C 13/00 422/177 |
| 2013/0089800 | A1 | 4/2013 | Merth et al. | |
| 2016/0016574 | A1 | 1/2016 | Yang et al. | |
| 2017/0346111 | A1* | 11/2017 | Eschenbach | H01M 8/04835 |
| 2019/0092174 | A1 | 3/2019 | Lee | |
| 2021/0066732 | A1* | 3/2021 | Jenssen | H01M 8/2484 |

FOREIGN PATENT DOCUMENTS

| | | |
|---|---|---|
| CN | 102939679 A | 2/2013 |
| DE | 102008016578 A1 | 10/2009 |
| DE | 102008020762 A1 | 10/2009 |
| DE | 102015011546 A1 | 3/2017 |
| DE | 102015117055 A1 | 4/2017 |
| DE | 102015014561 A1 | 5/2017 |
| DE | 102018200681 A1 | 7/2019 |
| JP | 2004192889 A | 7/2004 |
| JP | 2006210053 A | 8/2006 |
| JP | 2007073455 A | 3/2007 |
| JP | 2007200705 A | 8/2007 |
| JP | 2010182468 A | 8/2010 |
| JP | 2011517021 A | 5/2011 |
| JP | 2013037836 A | 2/2013 |
| JP | 2013247051 A | 12/2013 |
| JP | 2016122571 A | 7/2016 |
| KR | 20080040337 A | 5/2008 |
| WO | 2015180746 A1 | 12/2015 |

OTHER PUBLICATIONS

Translation of International Search Report for Application No. PCT/EP2020/066266 dated Sep. 14, 2020 (2 pages).

* cited by examiner

FUEL CELL SYSTEM WITH A VENTILATION LINE AND/OR A COMPRESSOR VENTILATION LINE, METHOD FOR VENTILATING A HOUSING OF A FUEL CELL SYSTEM AND VEHICLE

BACKGROUND OF THE INVENTION

In mobile applications, fuel cell systems are increasingly being used for energy supply. A fuel cell system comprises a fuel cell stack, which is preferably formed from a plurality of fuel cells and generates electrical energy on the basis of a reaction between a hydrogen-based fuel gas (for example pure hydrogen) and an oxidant feed gas (for example pure oxygen or oxygen-containing air). For this purpose, hydrogen is fed to an anode of the fuel cell stack, while air is fed to a cathode of the fuel cell stack. The main application of the fuel cell system is the supply of electrical energy, e.g. to a vehicle electrical system, in particular that of a motor vehicle.

If there is a leak in the fuel cell system, as a result of which, for example, hydrogen escapes into a housing which surrounds the fuel cell stack, or into the surroundings, an inflammable mixture can be formed, e.g. when hydrogen emerges. This mixture can lead to combustion or explosion in the presence of a spark. This represents a considerable hazard potential in industrial applications. Various solutions are used to minimize the hazard potential which arises from the escape of hydrogen from a fuel cell system.

The solution in WO 2015/180746 A1 is a fuel cell system having a fuel cell stack in a housing, wherein the housing has at least one ventilation connection to the surroundings.

It is also possible to use fans, which contribute to improving the hydrogen ventilation. DE 10 2008 020 762 A1 discloses a fuel cell system having a fuel cell stack in a housing, wherein fans are arranged in the feed air duct or exhaust air duct. A fuel cell housing having a fuel cell stack and a fan is also disclosed in JP 2010-182468 A.

SUMMARY OF THE INVENTION

The present invention relates to a fuel cell system, a method for ventilating a housing of a fuel cell system, and a motor vehicle having a fuel cell system.

Further features and details of the invention will become apparent from the dependent claims, the description and the drawings. Here, features and details which are described in connection with the fuel cell system according to the invention also apply, of course, in connection with the method according to the invention and vice versa in each case, and therefore reciprocal reference is or may always be made in respect of the disclosure relating to the individual aspects of the invention.

According to a first aspect, the present invention shows a fuel cell system with at least one fuel cell, wherein each fuel cell has a cathode inlet, a housing, in which the at least one fuel cell is arranged, wherein the housing has at least one ventilation inlet for the inflow of at least one ventilation fluid and at least one outflow outlet for the outflow of at least one outflow fluid. Furthermore, the fuel cell system comprises a supply line to the at least one cathode inlet for providing a supply fluid from a first fluid source to the at least one cathode inlet, and a compressor in the supply line for compressing the supply fluid. Furthermore, the fuel cell system comprises a fluidly communicating ventilation line between the supply line and the at least one ventilation inlet for connecting the supply line to the at least one ventilation inlet, wherein the fluidly communicating ventilation line is connected to the supply line between the compressor and the at least one cathode inlet, and/or a compressor cooling line for cooling the compressor and a fluidly communicating compressor ventilation line between the compressor cooling line and the at least one ventilation inlet for connecting the compressor cooling line to the at least one ventilation inlet.

One end of the compressor cooling line is advantageously connected to a second fluid source, which provides a cooling fluid. The other end of the compressor cooling line may be connected to one end of the compressor ventilation line and may provide the compressor ventilation line with the cooling fluid of the second fluid source. The other end of the compressor ventilation line is advantageously connected to at least one ventilation inlet.

A fuel cell system according to the invention has at least one fuel cell in a housing. This means that it is also possible to arrange a plurality of individual fuel cells to form a fuel cell stack and to arrange this fuel cell stack in the housing. Furthermore, it is also possible to arrange a plurality of individual fuel cell stacks in a housing and to interconnect them. The at least one fuel cell comprises at least one cathode inlet and, as is known, also at least one anode inlet and at least one coolant inlet. The at least one cathode inlet is connected to a supply line and is supplied with a supply fluid, in particular air, via this supply line. The supply fluid comes from a first fluid source, wherein the first fluid source for the cathode can be, for example, ambient air or a pressure accumulator containing air. It should be noted that the first fluid source is not covered by the subject matter of the invention. A compressor, which compresses the supply fluid, in particular air, is arranged in the supply line. A compressor can also be understood to mean a blower, fan or ventilator. Consequently, compression results in a flow of the supply fluid in the direction of the at least one cathode inlet of the at least one fuel cell. As is known, the at least one anode inlet and the at least one coolant inlet are also supplied with corresponding supply fluids, in particular a fuel, such as hydrogen, or coolant, via further supply lines. These supply fluids also come from corresponding fluid sources.

A housing according to the invention can be embodied in such a way as to be electrically insulating in order to ensure protection against contact with live parts. Furthermore, a housing can form a mechanical protection and a receptacle for the at least one fuel cell. Furthermore, a particularly fluid-tight housing may be advantageous. Fluid-tight means that no chamber fluid randomly flows from the interior of the housing to the exterior of the housing. The interior of the housing is the space surrounded/enclosed by the housing. The exterior of the housing is the space not surrounded/not enclosed by the housing. In particular, chamber fluid means an air mixture (e.g. air with hydrogen) in the housing which surrounds the at least one fuel cell and other parts, such as lines to the at least one cathode inlet of the at least one fuel cell. In a fluid-tight housing, therefore, a chamber fluid, in particular a ventilation fluid, can flow out only specifically via the at least one outflow outlet. Consequently, fluid-tight also means that lines, such as pipes, hoses and electrical lines, penetrate the housing in such a way that the housing is still fluid-tight. Furthermore, a housing can also have fluid couplings, wherein the fluid couplings can connect lines, such as supply lines and ventilation lines, outside the housing to lines within the housing in a fluidly communicating manner. These fluid couplings can preferably be integrated in a fluid-tight manner into the housing, i.e. these fluid couplings also allow fluid communication between lines outside the housing and lines within the housing, but are integrated into the housing in such a way that no chamber fluid can pass randomly/accidentally from the interior of the housing to the exterior of the housing. If hydrogen accidentally escapes from a fuel cell into a housing, a fluid-tight housing can enable selective collection of hydrogen in the housing. For example, hydrogen may accidentally escape into a housing on account of leaks or a lack of leak-tightness of a fuel cell stack. Since hydrogen is lighter than air, hydrogen that has escaped will largely collect at a point in the housing that is furthest from the center of the earth. However, the hydrogen may also collect at some other point, for example a cavity on a fuel cell stack, because of the location of the escape. At the same time, collection of hydrogen at one point in the housing can permit a controlled outflow of hydrogen from the housing. If an outflow outlet is placed at a point on the housing at which hydrogen preferentially collects, a rapid and controlled outflow of hydrogen from the housing to a non-hazardous location can be made possible. If a housing were not embodied in a fluid-tight way, the hydrogen could accidentally escape at various points on the housing. The hydrogen may then collect outside the housing at a point, in particular of a vehicle, at which sparks may occur. These sparks may ignite the hydrogen. Thus, a suitably placed outflow outlet, particularly in combination with a fluid-tight housing, can make it possible for hydrogen to flow out of the housing in a controlled manner into the surroundings or into a container.

A ventilation inlet according to the invention and an outflow outlet may be understood as openings, in particular as parts of a housing, at which lines, pipes or hoses can be connected or introduced. These lines, pipes or hoses can be connected, for example, to fluid couplings which are integrated, in particular, into the housing. The at least one ventilation inlet according to the invention and the at least one outflow outlet make it possible to ventilate a housing. At the at least one ventilation inlet, a ventilation fluid, in particular air, can flow into the housing, flow through the housing, and, at the at least one outflow outlet, the ventilation fluid, together with fuel, in particular hydrogen, which has escaped in the housing, flows out again as the outflow fluid. If the outflow fluid can flow freely into the surroundings without danger, an outflow outlet of a housing can simply form an opening in the housing. Advantageously, a ventilation fluid also flows around the at least one fuel cell as it flows through the housing. Since heat is generated during operation of the at least one fuel cell, explosive hydrogen and/or heat can be removed from the at least one fuel cell and/or heated air surrounding the at least one fuel cell via the at least one outflow outlet with the aid of the ventilation fluid flowing through. The lower explosion limit of hydrogen in air increases with decreasing temperature, i.e. the lower the temperature of the hydrogen-air mixture, the less likely the hydrogen-air mixture is to explode. The removal of the heat and of the hydrogen can therefore, on the one hand, bring about an increase in the performance of the at least one fuel cell, but, on the other hand, can also contribute to the safety of the fuel cell system. Furthermore, it is thereby possible to set a particularly optimum operating point for the at least one fuel cell.

According to the invention, a fluidly communicating ventilation line connects the supply line to the at least one ventilation inlet of the housing. As will be understood, it is also possible for a plurality of ventilation lines to connect the supply line to the at least one ventilation inlet. Advantageously, the fuel cell system according to the invention makes the supply fluid available not only to the at least one cathode inlet but at the same time also to the at least one ventilation inlet. As a result, the supply fluid, which can also be referred to as ventilation fluid in the ventilation line, can also flow from a first fluid source to the at least one ventilation inlet. The supply fluid flows into the housing via the at least one ventilation inlet, flows in the housing and flows out as outflow fluid via the at least one first ventilation outlet. As it flows through the housing, the supply fluid can mix with the hydrogen, with the supply fluid/hydrogen mixture emerging as outflow fluid from the at least one first ventilation outlet. Since hydrogen is lighter than air, hydrogen that has escaped in the housing will spontaneously rise, that is to say move away from the center of the earth. It is therefore particularly advantageous if an outflow outlet of the housing is arranged in such a way, in particular at the top, that hydrogen also spontaneously flows out of the housing via the at least one first ventilation outlet. The fluidly communicating ventilation line is advantageously connected to the supply line, which is situated between the compressor and the at least one fuel cell. In order to ventilate the housing, recourse is consequently had to the supply line, which is present in any case, with supply fluid under pressure.

The compressor in the supply line can also be a compressor, in particular a turbocompressor, having a compressor cooling line. This compressor cooling line serves to cool the compressor in that a cooling fluid, in particular air, flows under pressure through the compressor cooling line and removes heat from the compressor. The cooling fluid can be provided by a second fluid source, wherein the second fluid source can be the ambient air or pressure accumulators containing air. The first fluid source and the second fluid source may also be one and the same fluid source, in particular the ambient air. By virtue of the fluidly communicating compressor ventilation line between the compressor cooling line and the at least one ventilation inlet, the cooling fluid can now advantageously flow from the second fluid source to the at least one ventilation inlet. The cooling fluid in the compressor ventilation line may also be referred to as ventilation fluid. As will be understood, it is also possible for a plurality of compressor ventilation lines to connect a plurality of compressor cooling lines to at least one ventilation inlet. The cooling fluid flows into the housing via the at least one ventilation inlet, flows in the housing and flows out as outflow fluid via the at least one first ventilation outlet. As it flows through the housing, the cooling fluid can mix with the hydrogen, with the cooling fluid/hydrogen mixture emerging as outflow fluid from the at least one first ventilation outlet. In order to ventilate the housing, recourse is consequently had to the available pressurized cooling fluid. Furthermore, a pressurized fluid, such as the supply fluid and/or cooling fluid, has the advantage for ventilation of a housing that accidentally escaped hydrogen is carried away from a housing particularly quickly, efficiently and safely. By using the cooling fluid and/or the supply fluid as a ventilation fluid, ventilation of a housing thus takes place in a low-cost and simple manner. Furthermore, the safety of the fuel cell system can be improved.

It may be advantageous if a heat exchanger, in particular a charge-air cooler, is arranged in the supply line of a fuel cell system according to the invention between the compressor and the at least one cathode inlet, and the fluidly communicating ventilation line is connected to the supply line, which is situated between the heat exchanger and the at least one fuel cell. The supply fluid flows into the heat exchanger and its temperature is adjusted by the heat exchanger, and the supply fluid flows out of the heat exchanger again as a temperature-controlled supply fluid.

Since the fluidly communicating connecting line connects the supply line to the at least one ventilation inlet, the temperature-controlled supply fluid also flows into the housing as a temperature-controlled supply fluid (ventilation fluid). The temperature-controlled ventilation fluid can particularly advantageously flow through the housing and flow out again from the at least one outflow outlet. In particular, a heat exchanger can be subjected to open-loop or closed-loop control, ensuring that an optimum operating point for the at least one fuel cell is set by the temperature-controlled supply fluid.

It may furthermore be advantageous if, in a fuel cell system according to the invention, a humidifier is arranged in the supply line between the compressor and the at least one cathode inlet of at least one fuel cell, and the fluidly communicating ventilation line is connected to the supply line, which is situated between the humidifier and the at least one fuel cell. The supply fluid flows into the humidifier and its temperature is humidified by the humidifier, and the supply fluid flows out of the humidifier again as a humidified supply fluid. The fluidly communicating connecting line connects the supply line to the at least one ventilation inlet, as a result of which the humidified supply fluid flows into the housing as humidified supply fluid (ventilation fluid), flows in the housing and flows out as outflow fluid via the at least one first ventilation outlet. The water in the humidified ventilation fluid can additionally contribute to the cooling of the at least one fuel cell. This can bring about an increase in the performance of the at least one fuel cell, but can also contribute to the safety of the fuel cell system. The housing of the fuel cell system, the at least one fuel cell and other parts within the housing can be designed in such a way that they are not damaged by the moisture of the humidified ventilation fluid. In particular, a humidifier can be subjected to open-loop or closed-loop control, ensuring that an optimum operating point for the at least one fuel cell is set by the humidified supply fluid.

It may be advantageous if the fluidly communicating ventilation line of a fuel cell system according to the invention has a mass flow sensor between the supply line and the at least one ventilation inlet, and/or if the fluidly communicating compressor ventilation line has a mass flow sensor between the compressor cooling line and the at least one ventilation inlet. A mass flow sensor has the advantage that the rate of flow of the supply fluid through a ventilation line and/or the rate of flow of the cooling fluid through a compressor ventilation line can be detected and optionally subjected to open-loop or closed-loop control. Advantageously, a flow rate of a supply fluid and/or of a cooling fluid can be set to a minimum by open-loop or closed-loop control, while it is still possible, nevertheless, to achieve adequate ventilation of a housing. Particularly advantageously, the rate of flow of the supply fluid through a ventilation line and/or the rate of flow of the cooling fluid through a compressor ventilation line can be detected and optionally subjected to open-loop or closed-loop control if an outflow line has a mass flow sensor between the at least one outflow outlet and an outflow element. Furthermore, it is also possible to monitor by means of a mass flow sensor whether the supply fluid is flowing into the housing for ventilation and whether safe operation of the fuel cell system is possible.

Furthermore, it may be advantageous in a fuel cell system according to the invention if the at least one ventilation inlet is arranged in the lower third, in particular on the lower end of the lower third, of the housing and/or the at least one outflow outlet is arranged in the upper third, in particular on the upper end of the upper third, of the housing. In functional use of the fuel cell system, the lower third of the housing, in particular the lower end, is closer to the center of the earth than the upper third of the housing, in particular the upper end. Accidentally escaping hydrogen rises automatically in the housing owing to the lower density in comparison to air, i.e. it moves away from the center of the earth. Consequently, hydrogen will collect in a housing at the point of the housing furthest away from the center of the earth. The at least one fuel cell is preferably arranged in the housing in such a way that the accidentally escaping hydrogen can collect in the upper third of the housing. The removal of the hazardous hydrogen can be improved by arranging the at least one outflow outlet in the upper third of the housing. In particular, the arrangement of at least one outflow outlet on the upper end can make possible a particularly advantageous natural removal of the hydrogen. The arrangement of the at least one ventilation inlet in the lower third of the housing can assist removal of accidentally escaping hydrogen. If hydrogen escapes in the lower third of the housing, a ventilation fluid flowing in in the lower third can mix with the hydrogen in a particularly advantageous way and flow out of the outflow outlet. It may be particularly advantageous if the at least one ventilation inlet is arranged in the lower third and the at least one outflow outlet is arranged in the upper third. As a result, it is possible for a ventilation fluid to flow around particularly long distances in the housing, many points of the housing and further parts located in the housing, such as, for example, lines, from the at least one ventilation inlet to the at least one ventilation outlet and mix with the hydrogen. Consequently, most points in the housing at which hydrogen has collected and/or most points of the at least one fuel cell at which hydrogen accidentally escapes can be covered by the flow of the ventilation fluid. In this way, the heat generated during operation of the at least one fuel cell, explosive hydrogen and/or heat can be removed in an advantageous manner from the at least one fuel cell and/or heated air surrounding the at least one fuel cell via the at least one outflow outlet with the aid of the ventilation fluid flowing through. Thus, ventilation of a housing takes place in a low-cost and simple manner, and furthermore the safety of the fuel cell system is improved.

It may be advantageous if, in a fuel cell system according to the invention, a heat exchanger for controlling the temperature of the supply fluid is arranged in the fluidly communicating ventilation line, and/or a heat exchanger for controlling the temperature of the cooling fluid is arranged in the fluidly communicating compressor ventilation line. The heat exchanger in the fluidly communicating ventilation line can control the temperature of the supply fluid and/or the heat exchanger in the fluidly communicating compressor ventilation line can control the temperature of the cooling fluid. This also means that the at least one fuel cell can be temperature-controlled by means of the ventilation fluid flowing in the housing. Furthermore, the temperature of the supply fluid flowing into the at least one cathode inlet and the temperature of the supply fluid flowing into the at least one ventilation inlet as ventilation fluid can differ. As a result, a particularly advantageous operating point of the at least one fuel cell can be achieved, in particular can be set by closed-loop or open-loop control. It would also be conceivable for a common heat exchanger to be arranged in the fluidly communicating ventilation line and the fluidly communicating compressor ventilation line. In this case, it is advantageous that the costs are reduced and less space is required for accommodating the heat exchanger, particularly in a vehicle. Furthermore, a heat exchanger can be arranged in the ventilation line and/or the compressor ventilation line in proximity, in particular in direct proximity, to the housing of the fuel cell system. This has the advantage that the temperature of the ventilation fluid and/or of the cooling fluid downstream of the heat exchanger as far as the at least one ventilation inlet remains virtually constant and particularly favorable control is possible.

It may furthermore be advantageous in a fuel cell system according to the invention if there is in the fluidly communicating ventilation line a shut-off unit for interrupting the fluid communication between the first fluid source and the at least one ventilation inlet, and/or there is in the compressor ventilation line a shut-off unit for interrupting the fluid communication between the second fluid source and the at least one ventilation inlet. A shut-off unit can be understood as meaning, for example, a cock or valve, in particular a valve subject to closed-loop or open-loop control. The flow of the supply fluid and/or of the cooling fluid through the at least one ventilation inlet can thereby be subjected to open-loop and/or closed-loop control. In particular, a shut-off unit in the ventilation line is particularly advantageous. If adequate ventilation of a housing is already being accomplished by the cooling fluid in the compressor ventilation line, the shut-off unit in the ventilation line can interrupt the fluid communication and the supply fluid can flow completely into the at least one cathode inlet. As a result, a particularly advantageous operating point of the at least one fuel cell can be achieved, in particular can be set by closed-loop or open-loop control. For maintenance work in or on the housing, e.g. on the fuel cell, it may furthermore be useful to interrupt both fluid communication in the ventilation line and fluid communication in the compressor ventilation line. Interruption means that a shut-off unit, such as a valve, is closed. If a shut-off unit in the compressor ventilation line interrupts the fluid communication between the second fluid source and the at least one ventilation inlet, it must be ensured that the cooling fluid can flow out between the compressor cooling line and the shut-off unit to ensure that there is cooling of the compressor. This can be accomplished, for example, by a compressor which has a plurality of compressor cooling lines. Some of the compressor lines can be connected by means of compressor ventilation lines to a ventilation inlet of a housing for ventilation thereof, and some of the compressor cooling lines can be used for continuous cooling of the compressor.

Furthermore, it may be advantageous in a fuel cell system according to the invention if the heat exchanger in the fluidly communicating ventilation line and/or the shut-off unit in the fluidly communicating ventilation line and/or the heat exchanger in the fluidly communicating compressor ventilation line and/or the shut-off unit in the fluidly communicating compressor ventilation line is/are controlled by means of a controller. The controller can also control the compressor, a heat exchanger and a humidifier in the supply line. If appropriate, the controller can also control other components of the fuel cell system and components which are not explicitly listed here. Particularly favorable, safe and advantageous operation of the fuel cell can thereby be made possible. A controller can also be understood to mean an open-loop controller. A controller can control heat exchangers in such a way that the at least one ventilation fluid flowing into the housing controls the temperature of the at least one fuel cell in the housing. The controller can also permit periodic ventilation of the housing of the fuel cell system in that the controller controls the flow of the fluids through the shut-off units. The controller can also enable continuous ventilation. Furthermore, a hydrogen concentration sensor can be arranged in the housing of the fuel cell system, wherein the controller controls ventilation and/or temperature control, in particular via the shut-off elements in the ventilation line and/or the compressor ventilation line, of the housing as a function of the measured hydrogen concentration.

It may be advantageous in a fuel cell system according to the invention if the fuel cell system comprises a fluidly communicating outflow line between the at least one outflow outlet and an outflow element for connecting the at least one outflow outlet to the outflow element. An outflow line can be understood to mean, for example, a line, pipe or hose. The outflow line can enable controlled and selective removal of the outflow fluid. This may be necessary so that the hydrogen present in the outflow fluid can be directed to a non-hazardous location, in particular into the open (surroundings). The outflow line can also connect the at least one outflow outlet to a container as an outflow element. This container can be used to collect the hydrogen of the outflow fluid. The outflow line can also connect the at least one outflow outlet to an exhaust of a vehicle.

According to a second aspect, the present invention shows a method for ventilating a housing of a fuel cell system according to the invention
wherein the method comprises the steps of
providing a supply fluid
compressing the supply fluid by means of the compressor
flow of the supply fluid in the supply line
flow of at least some of the supply fluid as ventilation fluid in the fluidly communicating ventilation line
inflow of the ventilation fluid into the at least one ventilation inlet of the housing
flow of the ventilation fluid through the housing and simultaneously mixing the ventilation fluid with hydrogen to give an outflow fluid, and
outflow of the outflow fluid from the at least one outflow outlet of the housing
and/or the method comprises the steps of
providing a cooling fluid
compressing the cooling fluid
flow of the cooling fluid in the compressor cooling line to cool the compressor
flow of at least some of the cooling fluid as ventilation fluid in the fluidly communicating compressor ventilation line
inflow of the ventilation fluid into the at least one ventilation inlet of the housing
flow of the ventilation fluid through the housing and simultaneously mixing the ventilation fluid with hydrogen to give an outflow fluid, and
outflow of the outflow fluid from the at least one outflow outlet of the housing.

By means of a method according to the invention, a housing of a fuel cell system can be ventilated in a simple and favorable manner and, furthermore, the safety of the fuel cell system can be improved. The ventilation of the housing can be provided by a supply fluid and/or a cooling fluid.

When the housing is ventilated by a supply fluid, the supply fluid is provided in a first step. This supply fluid can be provided by a first fluid source, which is, in particular, the ambient air. Starting from the first fluid source, the supply fluid flows in the supply line in the direction of the fuel cell. A fluidly communicating ventilation line between the supply line and at least one ventilation inlet of a housing makes it possible for at least some of the supply fluid to flow as ventilation fluid in the fluidly communicating ventilation line. This ventilation fluid flows into the at least one ventilation inlet of the housing, flows through the housing and mixes with hydrogen to give an outflow fluid and flows out as outflow fluid from the at least one outflow outlet of the housing.

When the housing is ventilated by a cooling fluid, the cooling fluid is provided in a first step. This cooling fluid can be provided by a second fluid source, which is, in particular, the ambient air. The second fluid source and the first fluid source may be the same fluid source. Starting from the second fluid source, the cooling fluid flows in the compressor cooling line through the compressor and cools the compressor. A fluidly communicating compressor ventilation line between the compressor cooling line and at least one ventilation inlet of a housing makes it possible for at least some of the cooling fluid to flow as ventilation fluid in the fluidly communicating compressor ventilation line. This ventilation fluid flows into the at least one ventilation inlet of the housing, flows through the housing and mixes with hydrogen to give an outflow fluid and flows out as outflow fluid from the at least one outflow outlet of the housing.

The method according to the second aspect of the invention therefore has the same advantages as have already been described for the fuel cell system according to the first aspect of the invention.

According to a third aspect, the present invention shows a motor vehicle having a fuel cell system according to the invention. The motor vehicle according to the third aspect of the invention therefore has the same advantages as have already been described with respect to the fuel cell system according to the first aspect of the invention and the method according to the second aspect of the invention.

BRIEF DESCRIPTION OF THE DRAWINGS

Further measures that improve the invention will become apparent from the following description of a number of exemplary embodiments of the invention, which are illustrated schematically in the figures. All the features and/or advantages which emerge from the claims, the description or the drawings, including design details and spatial arrangements and method steps, may be essential to the invention either per se or in various combinations. It should be noted here that the figures have only a descriptive character and are not intended to restrict the invention in any form.

The following figures are each schematic and

DETAILED DESCRIPTION

Figure 1:
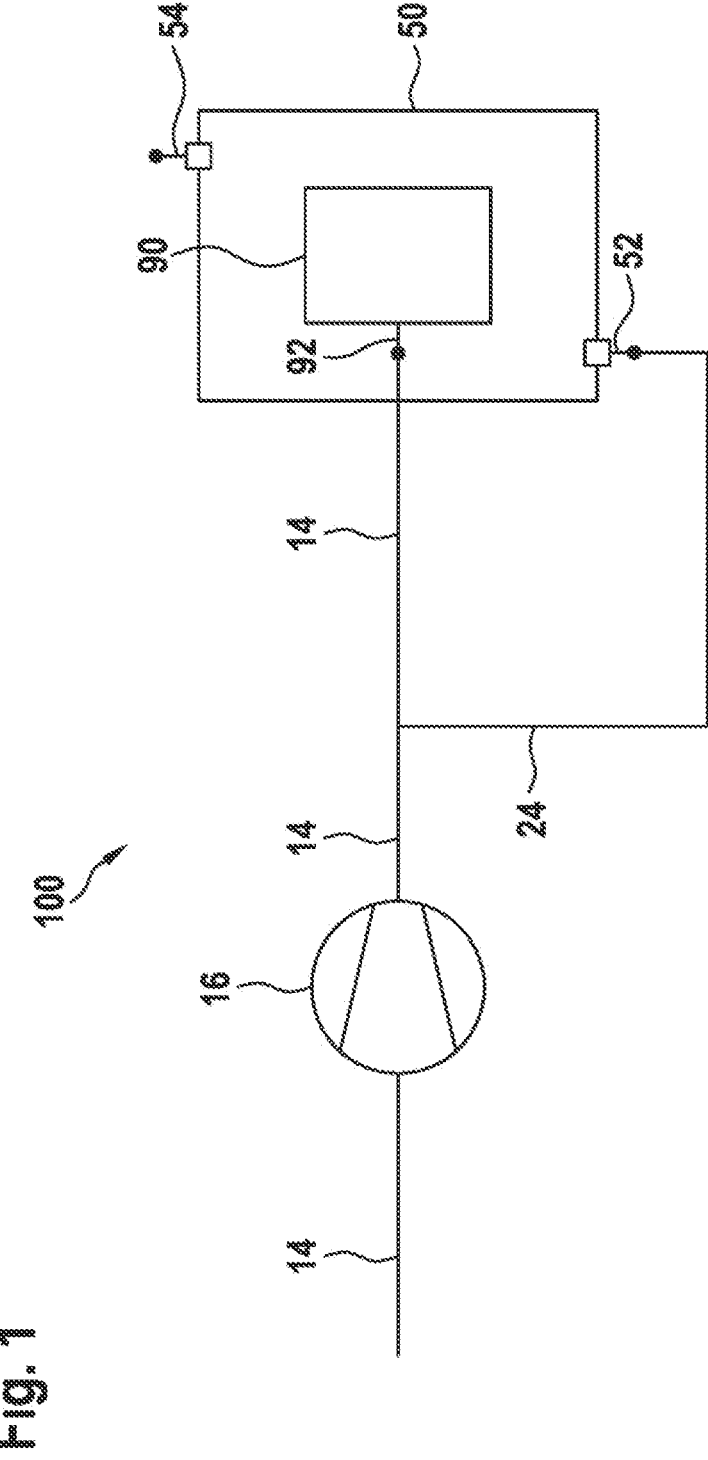
FIG. 1 shows a fuel cell system having a ventilation line.

In the following figures, identical reference signs are used for the same technical features, even of different exemplary embodiments.

FIGS. 1 to 13 show a fuel cell system 100 according to the invention with a compressor 6 and a supply line 14 for supplying the at least one fuel cell 90 with a supply fluid, in particular air. The supply line 14, which is not arranged between the compressor 16 and the at least one fuel cell 100, can be connected to a first fluid source, in particular the ambient air. This first fluid source and a second fluid source are not illustrated in FIGS. 1 to 11 and are also not covered by the subject matter of the invention. The compressor 16 compresses the supply fluid. The supply line 14 between the compressor 16 and the at least one fuel cell 90 is connected to the at least one cathode inlet 92 of the at least one fuel cell 90 and carries the compressed supply fluid. The at least one fuel cell 90 is arranged in a housing 50. The housing 50 can be used to protect the fuel cell but can be used especially to protect living beings. For all fluid-carrying lines, electrical lines, etc., the housing 50 has openings. Furthermore, the housing 50 has at least one ventilation inlet 52 and at least one outflow outlet 54. Lines for ventilating the interior of the housing 50 with ventilation fluids can be connected to this at least one ventilation inlet 52. Advantageously, a ventilation fluid flows through the interior of the housing 50 and flows out again from the at least one outflow outlet 54. According to the invention, the at least one ventilation fluid is a pressurized fluid necessary for the operation of the fuel cell system. This necessary fluid can be a supply fluid compressed by the compressor 16 and/or a compressed cooling fluid, which is required for cooling the compressor 16. A flow of a ventilation fluid through a housing 50 takes place through fluidly communicating ventilation lines 24 and/or fluidly communicating compressor ventilation lines 34 according to the invention. By using the pressurized fluids necessary for the operation of the fuel cell system, ventilation of a housing 50 can take place in a simple and low-cost manner. Furthermore, a pressurized fluid has the advantage for ventilation of a housing that accidentally escaped hydrogen is carried away from a housing particularly quickly, efficiently and safely. By means of the ventilation, it is advantageously possible to avoid hydrogen collecting in a high concentration in the housing 50 and becoming a hazard. Furthermore, temperature control of the at least one fuel cell 90 in the housing 50 can be brought about by the throughflow of a ventilation fluid. This temperature control can also influence the power of the fuel cell system 100, it being particularly advantageous if the at least one fuel cell 90 is adjusted to its optimum operating point. Various possible embodiments illustrated in FIGS. 1 to 11 will be discussed in more detail in the following paragraphs.

FIG. 1 shows a fuel cell system 100 according to the invention, wherein a fluidly communicating ventilation line 24 connects the supply line 14 to the at least one ventilation inlet 52 of the housing 50. Through this connection, the pressurized supply fluid can flow via the fluidly communicating ventilation line 24 into the housing 50 for ventilation of the housing 50. It is advantageous that the pressurized supply fluid, which is simultaneously used to supply the cathode of the at least one fuel cell 90, is used for ventilation. A separate compressor or a fan for ventilating the housing 50 is thereby eliminated. In FIG. 1, the ventilation line 24 extends outside the housing 50 to the at least one ventilation inlet 52. In this case, the ventilation line 24 could also run completely or partially within the housing 50.

Figure 2:
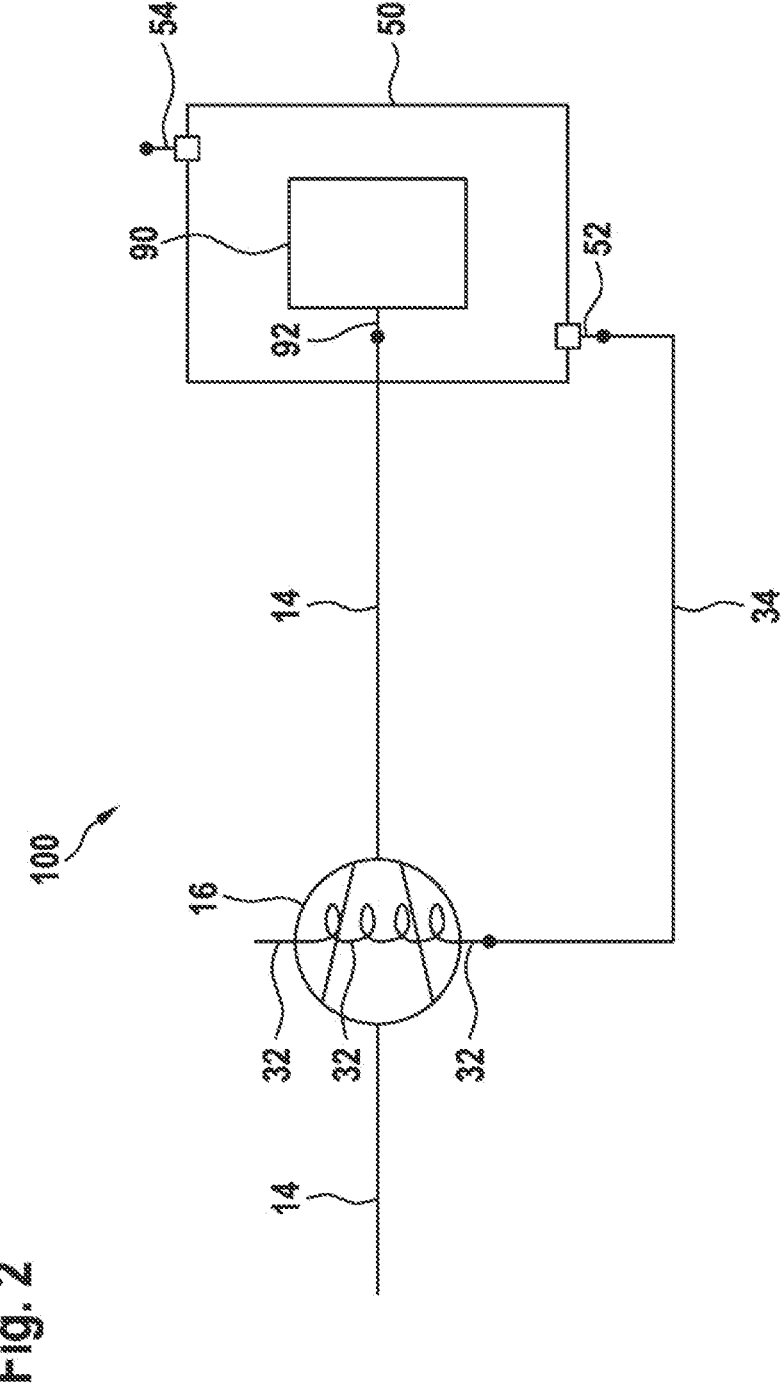
FIG. 2 shows a fuel cell system having a compressor ventilation line.

FIG. 2 shows a fuel cell system 100 according to the invention, wherein the compressor 16 is additionally cooled by means of a compressor cooling line 32. A compressor ventilation line 34 connects the one end of the compressor cooling line 32 to the at least one ventilation inlet 52. The other end of the compressor cooling line 32 can be connected to a second fluid source, in particular the ambient air. It is advantageous here that the fluid used for cooling the compressor 16 is also simultaneously used as ventilation fluid for ventilation of the housing 50. This means that ventilation of a housing 50 takes place in a particularly simple and low-cost manner. An additional compressor or a fan for ventilating the housing 50 can thereby be eliminated.

Figure 3:
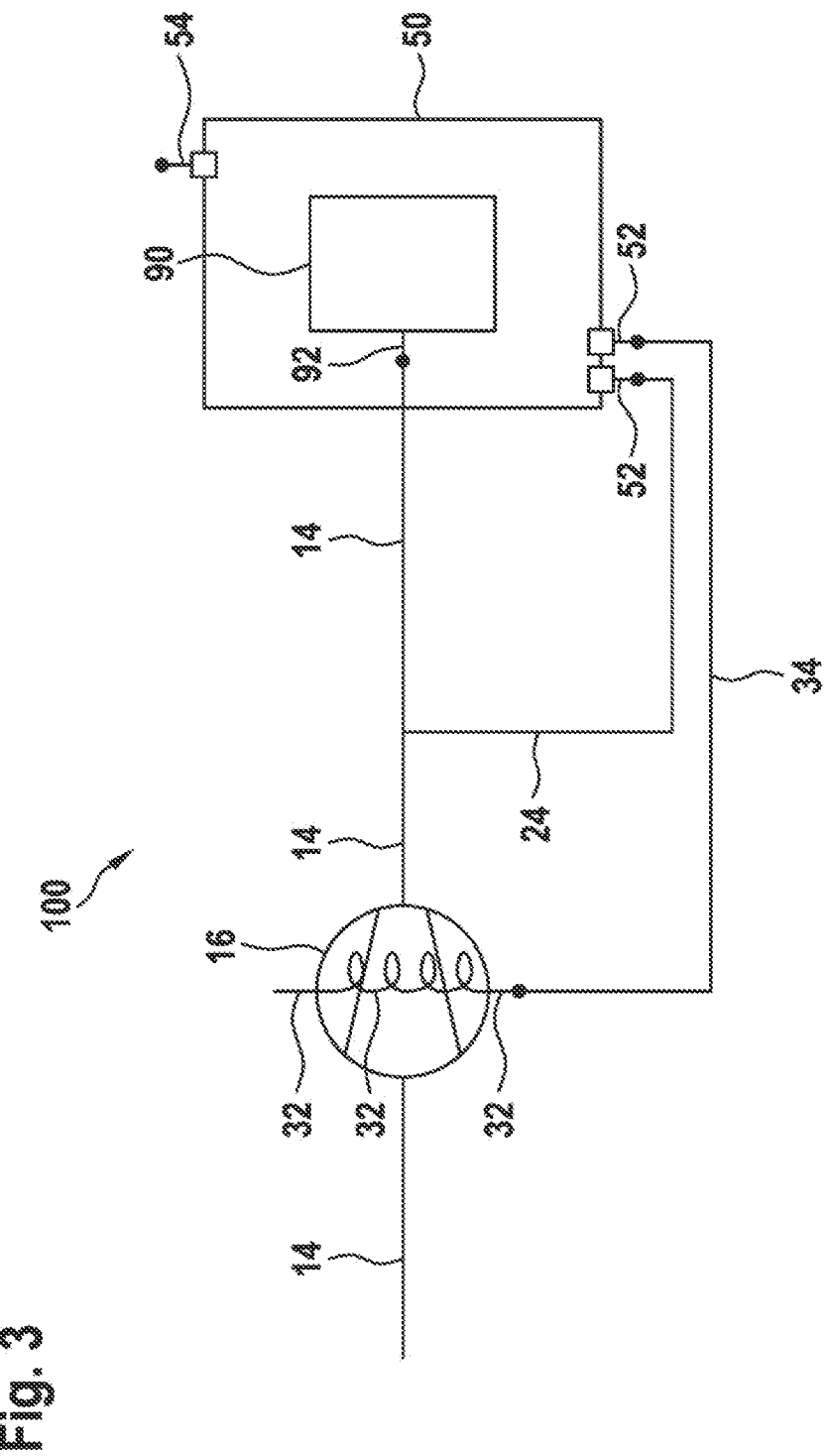
FIG. 3 shows a fuel cell system having a ventilation line and a compressor ventilation line.

FIG. 3 shows a combination of FIG. 1 and FIG. 2. This fuel cell system 100 according to the invention has both a ventilation line 24 and a compressor 16 with a compressor cooling line 32 and a compressor ventilation line 34. This means that, on the one hand, the cooling fluid can flow by means of the compressor ventilation line 34 and, on the other hand, the supply fluid can flow by means of the ventilation line 24 into the housing 50 via the ventilation inlets 52. Together, they flow through the housing 50 as a ventilation fluid and emerge again at the ventilation outlet 54. It is advantageous here that the effective diameter of the ventilation line 24 can be kept small since some of the ventilation fluid is provided by the cooling fluid. A small diameter of the ventilation line 24 also has the advantage that the pressure of the supply fluid at the at least one cathode inlet 92 of the at least one fuel cell 90 substantially corresponds to the output pressure of the compressor 16. The power of the at least one fuel cell 90 can be kept high despite the additional ventilation line 24.

Figure 4:
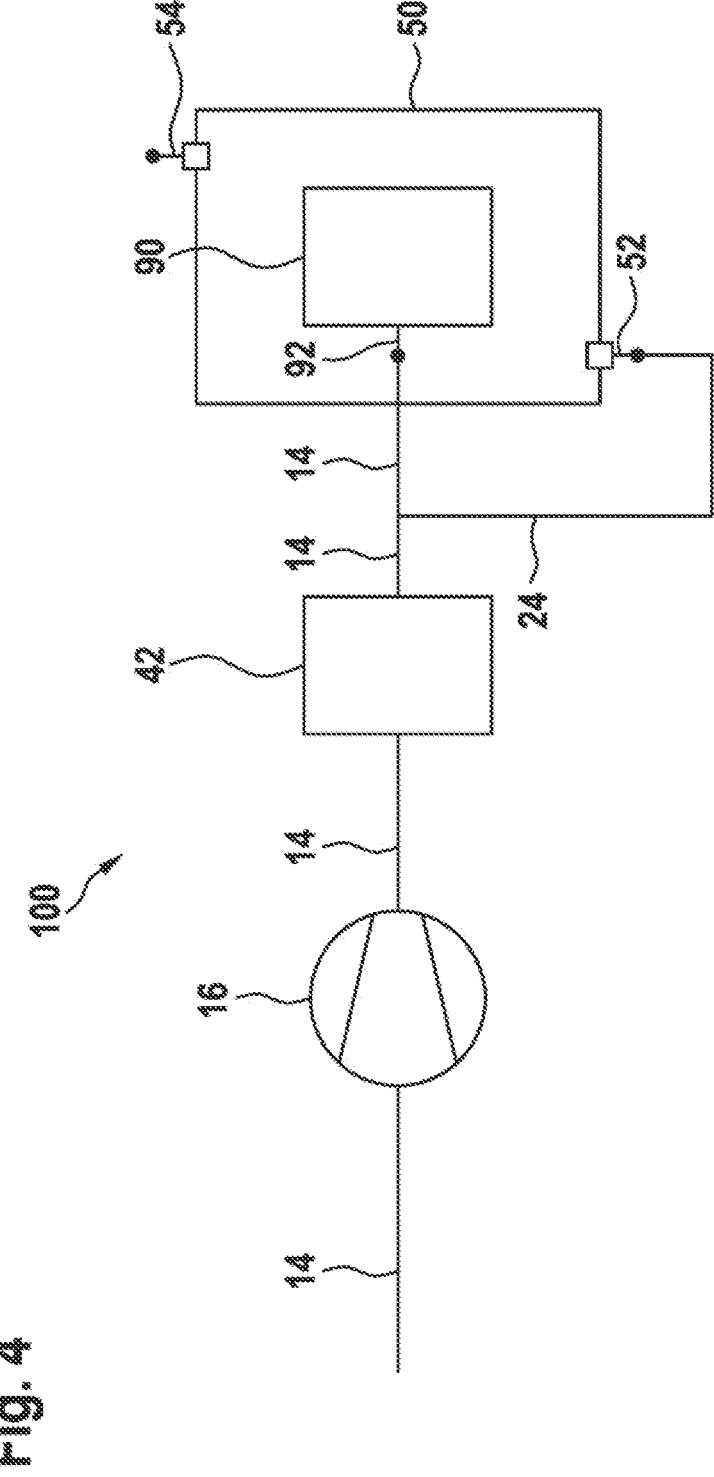
FIG. 4 shows a fuel cell system having a ventilation line and a heat exchanger.

A fuel cell system 100 according to the invention, illustrated in FIG. 4, corresponds to FIG. 1, wherein, in addition, in FIG. 4, a heat exchanger 42, in particular a charge-air cooler (intercooler), is arranged in the supply line 14. The heat exchanger 42 controls the temperature of the supply fluid to a temperature suitable for the operation of the at least one fuel cell 90. At the same time, according to the invention, the temperature-controlled supply fluid can flow by means of the ventilation line 24 via the at least one ventilation inlet 52 into the housing 50 as temperature-controlled ventilation fluid, can flow through the housing 50 and can flow out of the outflow outlet 54. It is advantageous here that the temperature-controlled ventilation fluid can also flow around the at least one fuel cell 90 as it flows through the housing 50. Since heat may be generated during operation of the at least one fuel cell 90, explosive hydrogen, heat from the at least one fuel cell 90 and/or heated air surrounding the fuel cell can be removed via the outflow outlet 54 with the aid of the ventilation fluid flowing through. Heating of the at least one fuel cell 90 by a temperature-controlled ventilation fluid would likewise be possible. This could be necessary when using the fuel cell system 100 in a vehicle at cold temperatures, in particular when starting the vehicle.

Figure 5:
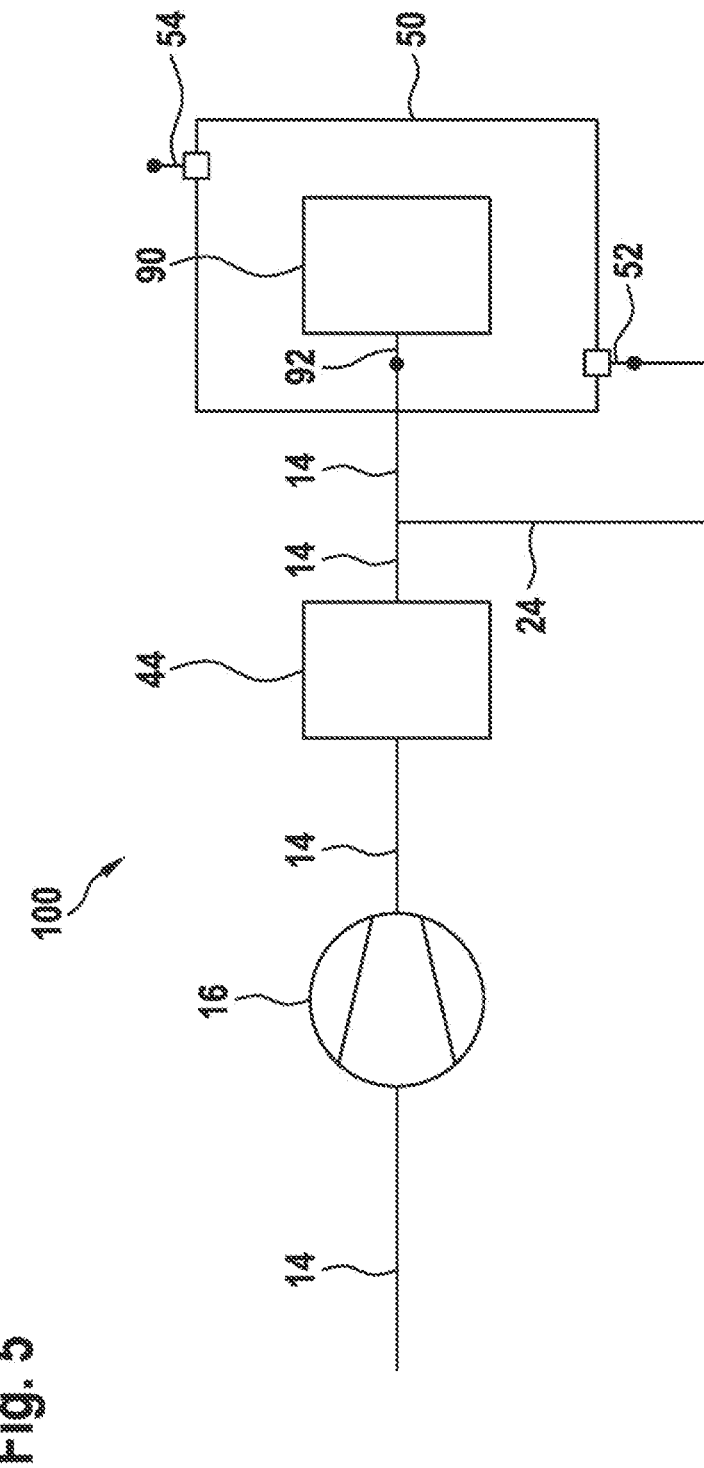
FIG. 5 shows a fuel cell system having a ventilation line and a humidifier.

The fuel cell system 100 according to the invention, shown in FIG. 5, corresponds to FIG. 1, wherein, in addition, in FIG. 5, a humidifier 44 is arranged in the supply line 14. The supply fluid humidified by the humidifier 44 on the one hand flows into at least one cathode inlet 92 of the at least one fuel cell 90 by means of the supply line 14 and on the other hand flows into the housing 52 as humidified ventilation fluid by means of the ventilation line 24 via the at least one ventilation inlet 52. By means of the humidified ventilation fluid, explosive hydrogen, heat from the at least one fuel cell 90 and/or heated air surrounding the fuel cell 90 can advantageously be removed. This can bring about an increase in the performance of the at least one fuel cell 90, but can also contribute to the safety of the fuel cell system 100. The water in the humidified ventilation fluid can additionally contribute to the cooling of the at least one fuel cell 90. Furthermore, the humidified ventilation fluid can perform a cleaning function. This means that dirt and dust in the interior of the housing 50 flows out of the outflow outlet 54 with the humidified ventilation fluid. It is also conceivable for dirt and dust to be as it were washed off and discharged to the outside via a dirt outlet (not illustrated) in the housing 50. The housing 50 of the fuel cell system 100, the at least one fuel cell 90 and other parts within the housing 50 can be designed in such a way that they are not damaged by the moisture of the humidified ventilation fluid. In particular, a humidifier 44 can humidify the supply fluid in such a way that an optimum operating point for the at least one fuel cell 90 is set.

Figure 6:
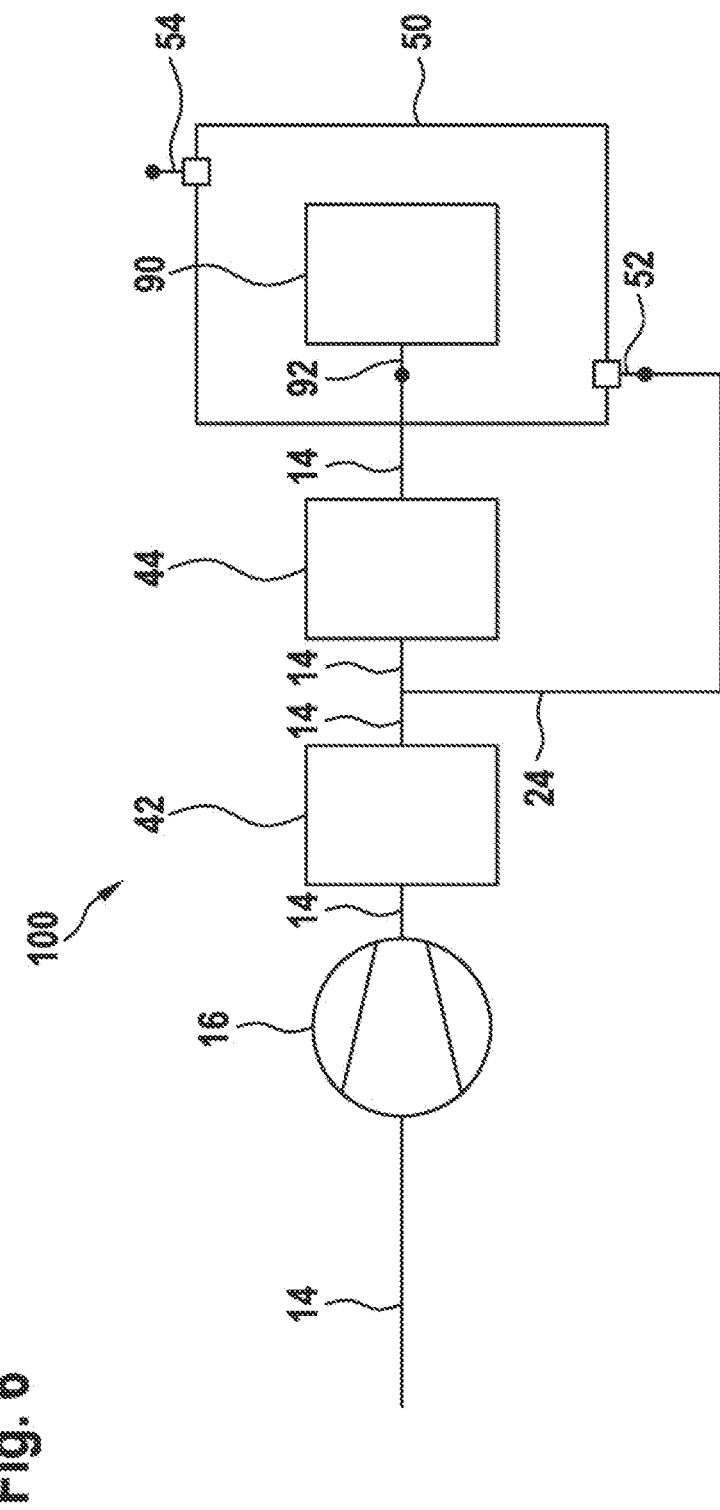
FIG. 6 shows a fuel cell system having a ventilation line, a heat exchanger and a humidifier.

FIG. 6 shows a fuel cell system 100 according to the invention as per FIG. 4, wherein, in addition, in the supply line 14, a humidifier 44 is connected downstream of a heat exchanger 42 and the ventilation line 24 is connected to the supply line 14, which is situated between the heat exchanger 42 and the humidifier 44. Consequently, as already described with reference to FIG. 4, a temperature-controlled ventilation fluid flows into the housing 52. For the purpose of the humidifier 44, on the other hand, a humidified and temperature-controlled supply fluid flows into the at least one cathode inlet. This results in at least the same advantages for this fuel cell system as those already explained in FIG. 4. A further advantage in this embodiment is that the temperature-controlled ventilation fluid flowing into the at least one ventilation inlet 52, in combination with the humidified and temperature-controlled supply fluid flowing into the at least cathode inlet 92 and thus into the at least one fuel cell 90, makes it possible to operate the fuel cell system 100, in particular the fuel cell 90, in a particularly favorable, efficient and safe manner.

Figure 7:
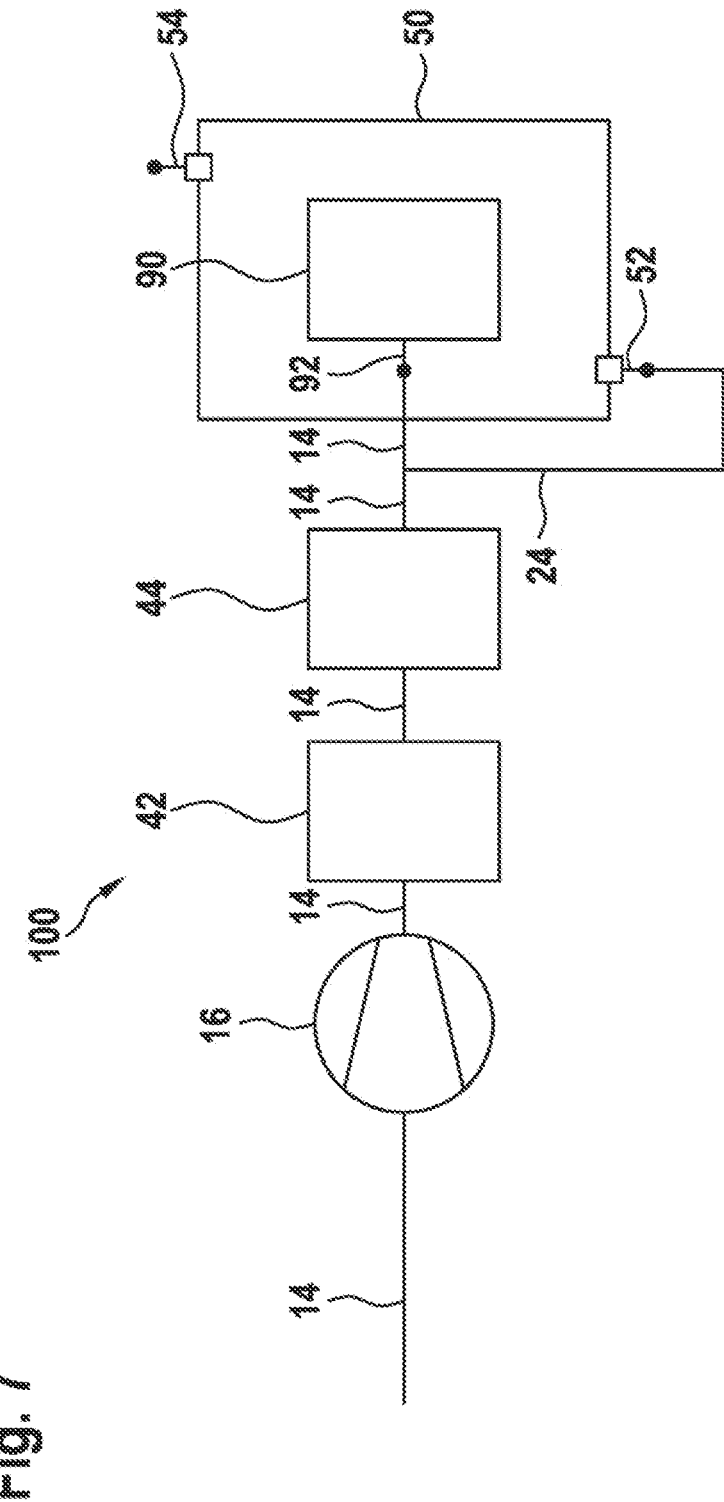
FIG. 7 shows a fuel cell system having a ventilation line, a heat exchanger and a humidifier.

FIG. 7 shows a fuel cell system 100 corresponding to FIG. 6, wherein the ventilation line 24 is connected to the supply line 14, which is situated between the humidifier 44 and the at least one cathode inlet 92. Thus, as already described in FIG. 6, a humidified and temperature-controlled supply fluid flows into the at least one cathode inlet 92 of the at least one fuel cell 90. This humidified and temperature-controlled supply fluid also flows simultaneously into the housing 50 by means of the ventilation line 24, via the at least one ventilation inlet 52. For the fuel cell system 100 in this embodiment, the advantages for the ventilation of the housing 50 with a temperature-controlled ventilation fluid are therefore combined, see description FIG. 4, and the advantages for the ventilation of the housing 50 with a humidified ventilation fluid are combined, see description FIG. 5.

Figure 8:
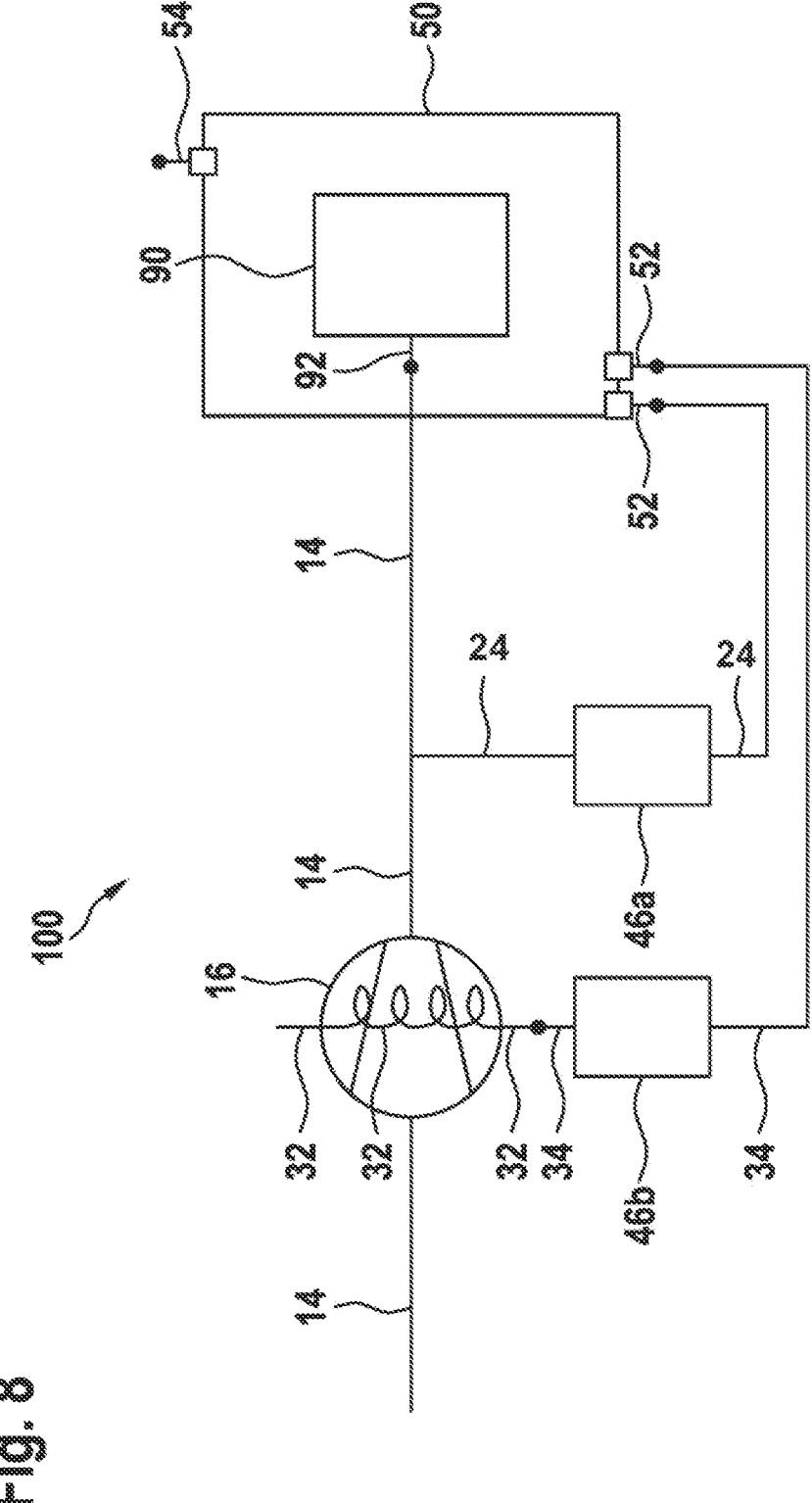
FIG. 8 shows a fuel cell system having a ventilation line, a compressor ventilation line and mass flow sensors.

FIG. 8 discloses a fuel cell system 100 according to the invention of the kind illustrated in FIG. 3, wherein, in addition, a mass flow sensor 46*a* is arranged in the ventilation line 24 and a mass flow sensor 46*b* is arranged in the compressor ventilation line 34. A mass flow sensor 46*a*, 46*b* has the advantage that the rate of flow of the supply fluid through a ventilation line 24 according to the invention and the rate of flow of the cooling fluid through a compressor ventilation line 34 can be detected and thus subjected to open-loop or closed-loop control. Advantageously, a flow rate of a ventilation fluid, i.e. of a supply fluid and/or of a cooling fluid, can be set to a minimum by open-loop or closed-loop control, while it is still possible, nevertheless, to achieve adequate ventilation of a housing 50. Furthermore, it is also possible to monitor by means of a mass flow sensor 46*a*, 46*b* whether the supply fluid is flowing into the housing 50 for ventilation and whether safe operation of the fuel cell system 100 is possible.

Figure 9:
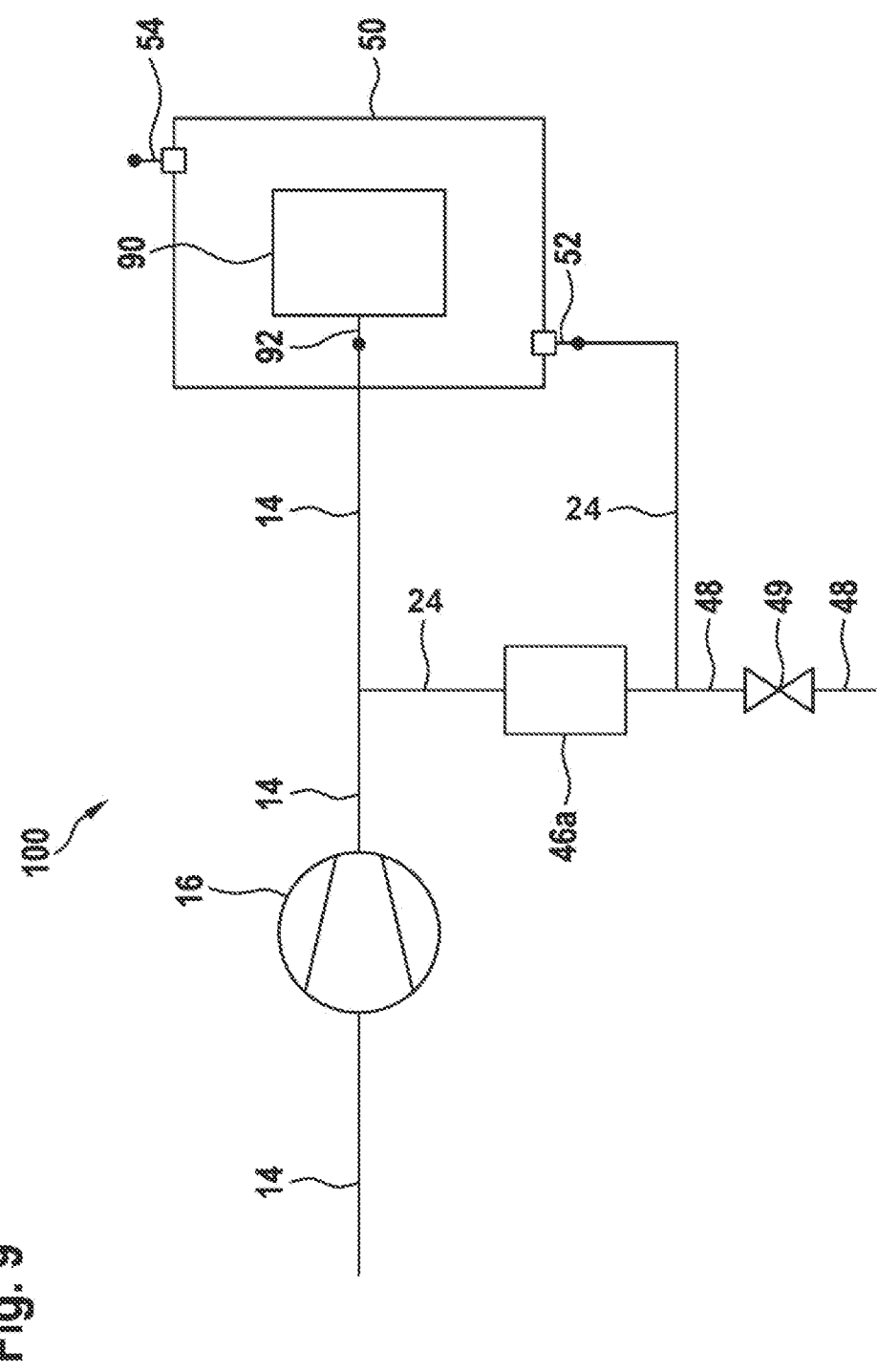
FIG. 9 shows a fuel cell system having a ventilation line, a bypass line, a bypass valve and a mass flow sensor.

FIG. 9 discloses a fuel cell system 100 according to the invention of the kind illustrated in FIG. 1, wherein, in addition, a mass flow sensor 46*a* is arranged in the ventilation line 24. It is conceivable for one end of a fluidly communicating bypass line 48 of the fuel cell system 100 to be connected to the ventilation line 24, meaning the ventilation line 24 between mass-flow sensor 46*a* and the at least one ventilation inlet 52. This bypass line 48 can have a valve 49, in particular an electrically controllable valve. The other end of the fluidly communicating bypass line 48 can end, for example, in the open (surroundings) or in the exhaust of a motor vehicle which has a fuel cell system 100 according to the invention. Opening the valve 49 in the bypass line 48 enables the supply fluid to flow out of the bypass line. It is thereby possible to reduce the pressure of the supply fluid in the supply line 14 and the pressure in the ventilation line 24.

Figure 10:
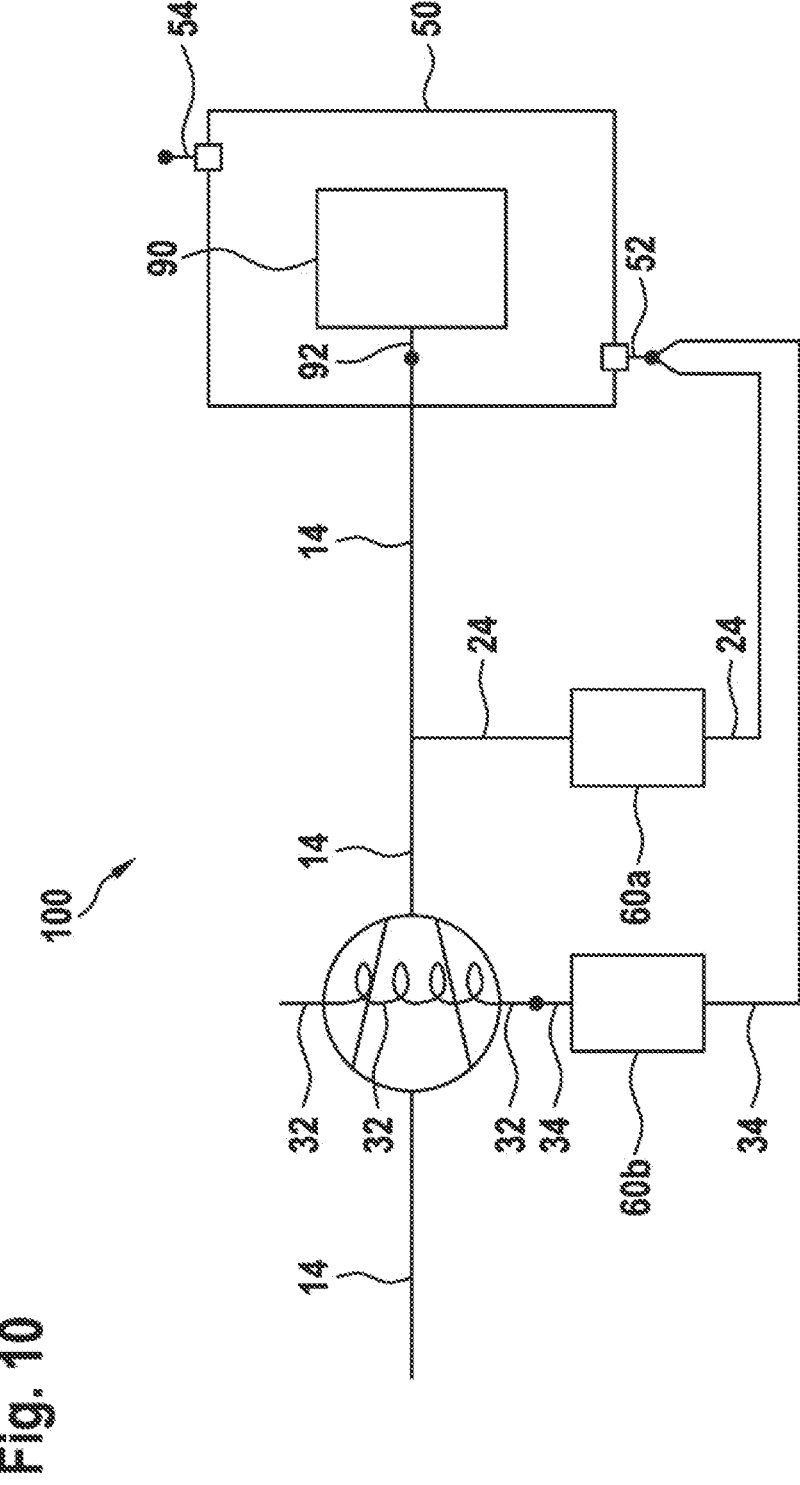
FIG. 10 shows a fuel cell system having a ventilation line, a compressor ventilation line and heat exchangers.

FIG. 10 illustrates a fuel cell system 100 according to the invention, wherein a heat exchanger 60*a* for controlling the temperature of the supply fluid is arranged in the ventilation line 24, and a heat exchanger 60*b* for controlling the temperature of the cooling fluid is arranged in the compressor ventilation line 34. It is thereby advantageously possible to control the temperature of the at least one fuel cell 90 by means of the temperature-controlled supply fluid and temperature-controlled cooling fluid flowing in the housing 50. It would also be conceivable for a common heat exchanger to be used to control the temperature of the supply fluid and of the cooling fluid. In this case, it is advantageous that the costs are reduced and less space is required for accommodating a heat exchanger, particularly in a vehicle. The heat exchanger 60*a* in the ventilation line 24 also has the advantage that the temperature of the supply fluid flowing into the housing 50 as ventilation fluid can differ from the temperature of the supply fluid flowing into the at least one cathode inlet 92 as a supply fluid. This means that, on the one hand, optimum supply of the at least one fuel cell 90 with the temperature-controlled supply fluid is possible and, on the other hand, optimum ventilation of the housing 50 with temperature-controlled ventilation fluid is possible. It is thereby possible to obtain a particularly favorable operating point for the fuel cell system 100, in particular for the at least one fuel cell 90.

Figure 11:
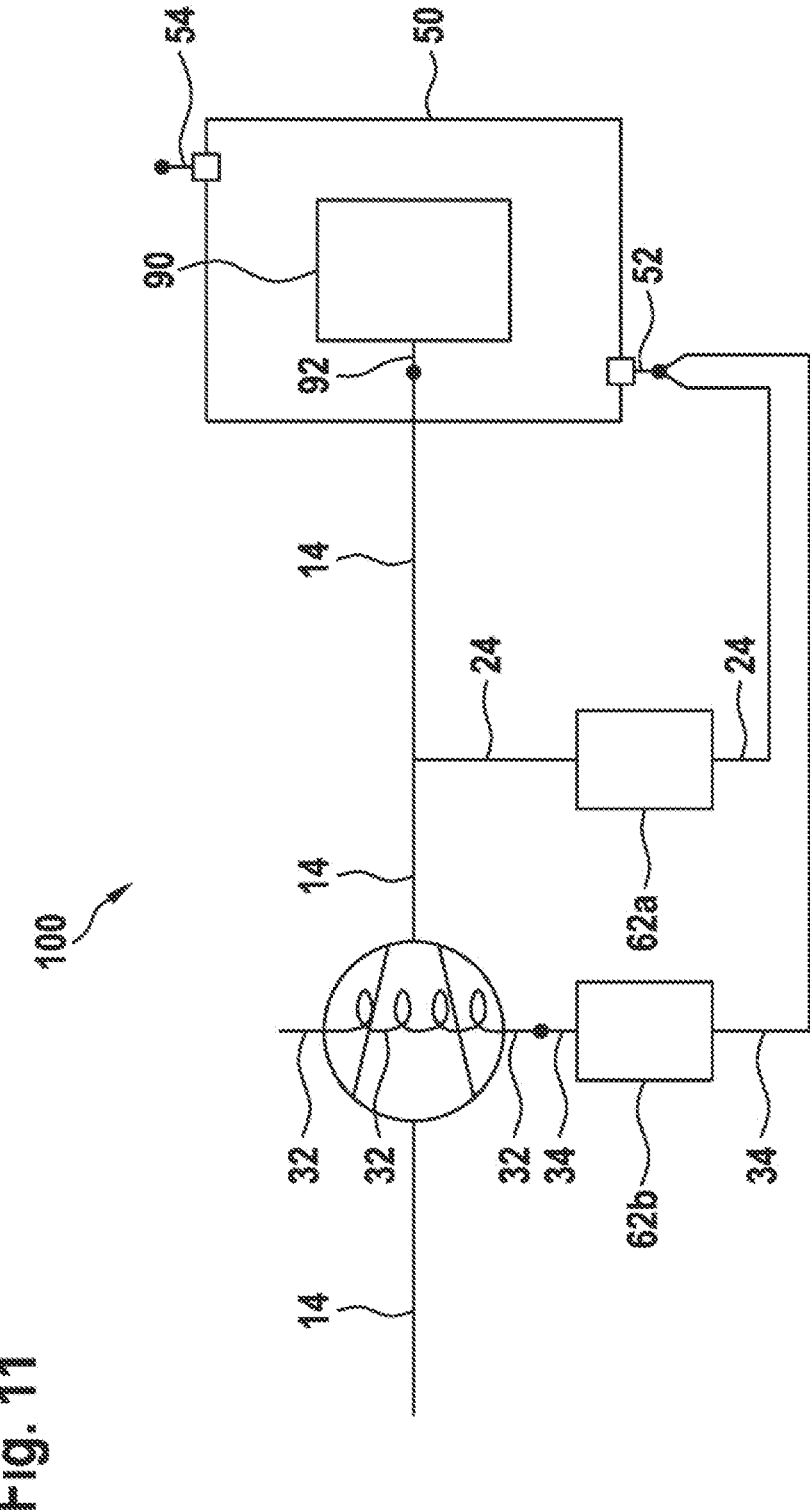
FIG. 11 shows a fuel cell system having a ventilation line, a compressor ventilation line and shut-off units.

FIG. 11 shows a fuel cell system 100 according to the invention, wherein a shut-off unit 62*a* is arranged in the ventilation line 24 and a shut-off unit 62*b* is arranged in the compressor ventilation line 34. Shut-off unit 62*a* allows for an interruption in the fluid communication between the first fluid source (not shown) and the at least one ventilation inlet 52, and shut-off unit 62*b* allows for an interruption in the fluid communication between the second fluid source (not shown) and the at least one ventilation inlet 52. A shut-off unit 62*a*, 62*b* can be, for example, a cock or valve, in particular a valve subjected to closed-loop or open-loop control. The flow of the supply fluid and/or of the cooling fluid through the at least one ventilation inlet 52 can thereby advantageously be subjected to open-loop and/or closed-loop control. It is also conceivable for just one shut-off unit 62*a* to be arranged in the ventilation line 24. It is thereby possible, on the one hand, to achieve continuous ventilation of the housing 50 by means of the compressor ventilation line 34. On the other hand, if necessary, the ventilation of the housing 50 can be intensified if the shut-off unit 62*a* in the ventilation line 24 is at least partially "open" and, in addition, the supply fluid flows through the housing 50 as a ventilation fluid. There could be a need, for example, if large amounts of hydrogen escape in the housing 50 owing to a technical defect, and increased removal of hydrogen becomes necessary in order to improve the safety of the fuel cell system 100.

Figure 12:
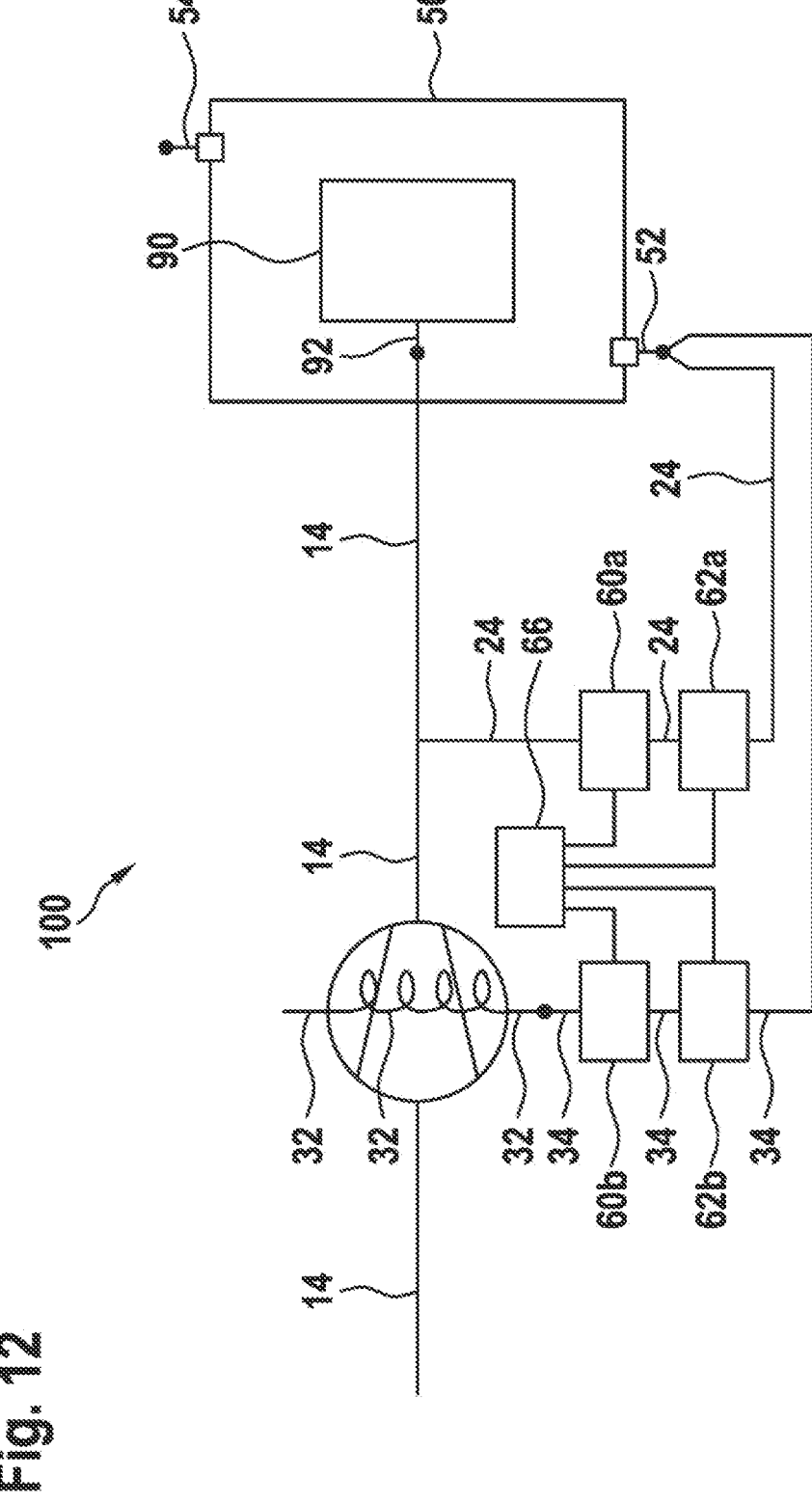
FIG. 12 shows a fuel cell system having a ventilation line, a compressor ventilation line, heat exchangers, shut-off units and a controller.

FIG. 12 illustrates a fuel cell system 100 according to the invention, wherein, as in FIG. 10, a heat exchanger 60*a* is arranged in the ventilation line 24 and a heat exchanger 60*b* is arranged in the compressor ventilation line 34 and, as in FIG. 11, a shut-off unit 62*a* is arranged in the ventilation line 24 and a heat exchanger 62*b* is arranged in the compressor ventilation line 34. In addition, FIG. 12 shows a controller 66 as part of the fuel cell system 100 according to the invention. The controller 66 can control the heat exchangers 60*a*, 60*b* and/or the shut-off units 62*a*, 62*b* in such a way that the temperature-controlled and/or throttled at least one ventilation fluid flowing into the housing 50 makes it possible to operate the fuel cell 90 in a particularly favorable, safe and advantageous manner. This can mean that the temperature and power of the fuel cell 90 can be controlled by a temperature-controlled and/or throttled ventilation fluid. The controller 66 can furthermore control the fuel cell system 100 in such a way that continuous ventilation of the housing 50 takes place via the compressor ventilation line 34, and the housing 50 is additionally ventilated via the ventilation line 24 only when required. The supply fluid can thereby be made fully available to the at least one cathode inlet 92. The controller 66 may further comprise a hydrogen concentration sensor (not shown) in the housing 52, wherein the controller 66 controls ventilation of the housing 50 as a function of the measured hydrogen concentration.

Figure 13:
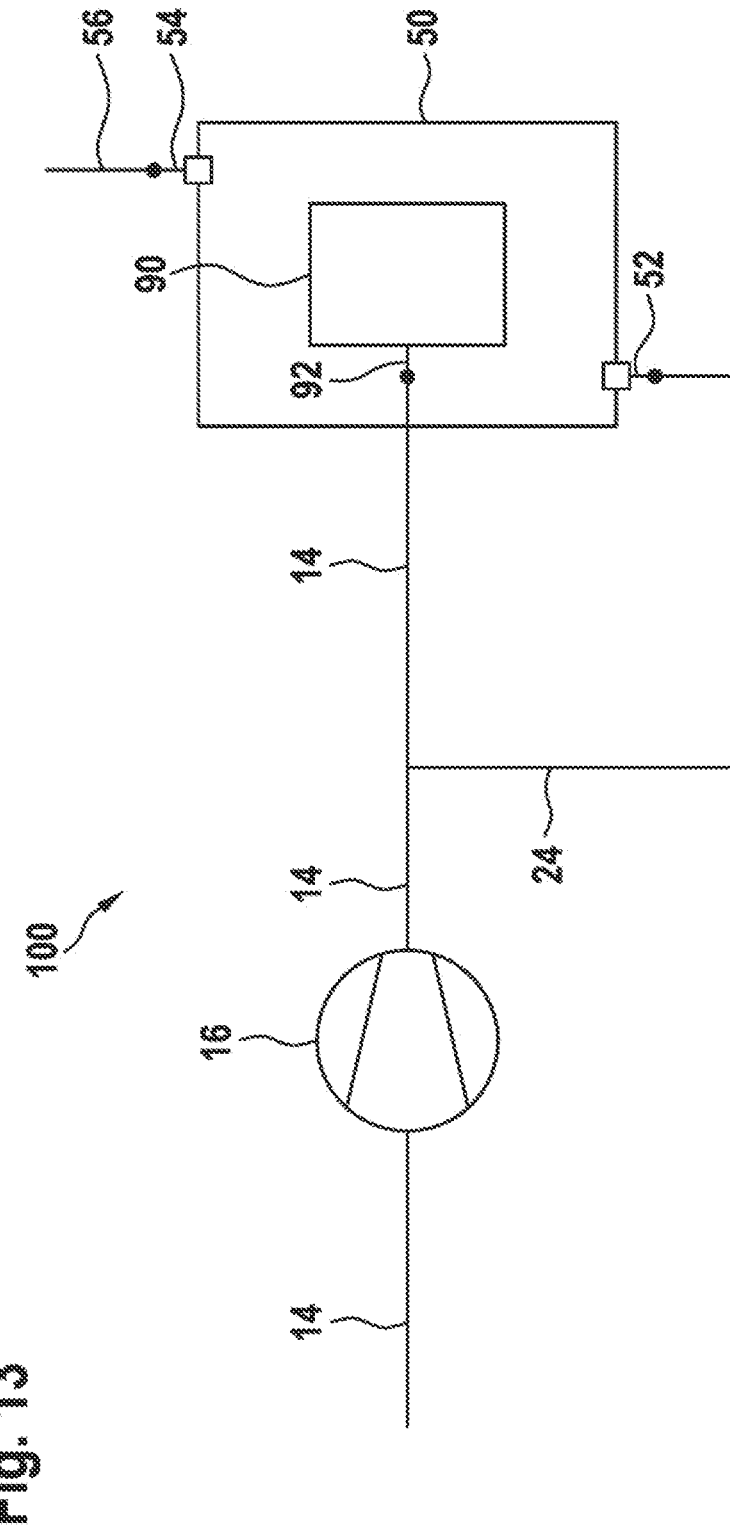
FIG. 13 shows a fuel cell system having a ventilation line and an outflow line.

FIG. 13 shows a fuel cell system 100 according to the invention with an outflow line 56 between the at least one outflow outlet 54 and an outflow element (not shown). An outflow line 56 can be understood to mean, for example, a line, pipe or hose. This outflow line 56 can enable controlled and selective removal of an outflow fluid. It is particularly advantageous if the housing 50 is designed to be fluid-tight. Fluid-tight means that no chamber fluid randomly flows from the interior of the housing 50 to the exterior of the housing 50. The interior of the housing 50 is the space surrounded/enclosed by the housing 50. The exterior of the housing 50 is the space not surrounded/not enclosed by the housing 50. In particular, chamber fluid means an air mixture (e.g. air with hydrogen) in the housing 50 which surrounds the at least one fuel cell 90 and other parts, such as lines to the at least one cathode inlet 92 of the at least one fuel cell 90. In a fluid-tight housing 50, therefore, a chamber fluid, in particular a ventilation fluid, can flow out only specifically via the at least one outflow outlet 54. A fuel cell system 100 according to the invention with a fluid-tight housing 50 and an outflow line 56 can consequently make it possible for an outflow fluid with hydrogen to be directed to a non-hazardous location, in particular into the open. The outflow line 56 can also connect the at least one outflow outlet 54 to a container as an outflow element. This container can be used to collect the hydrogen of the outflow fluid. The outflow line 56 can also connect the at least one outflow outlet 54 to an exhaust of a vehicle as an outflow element.

Figure 14:
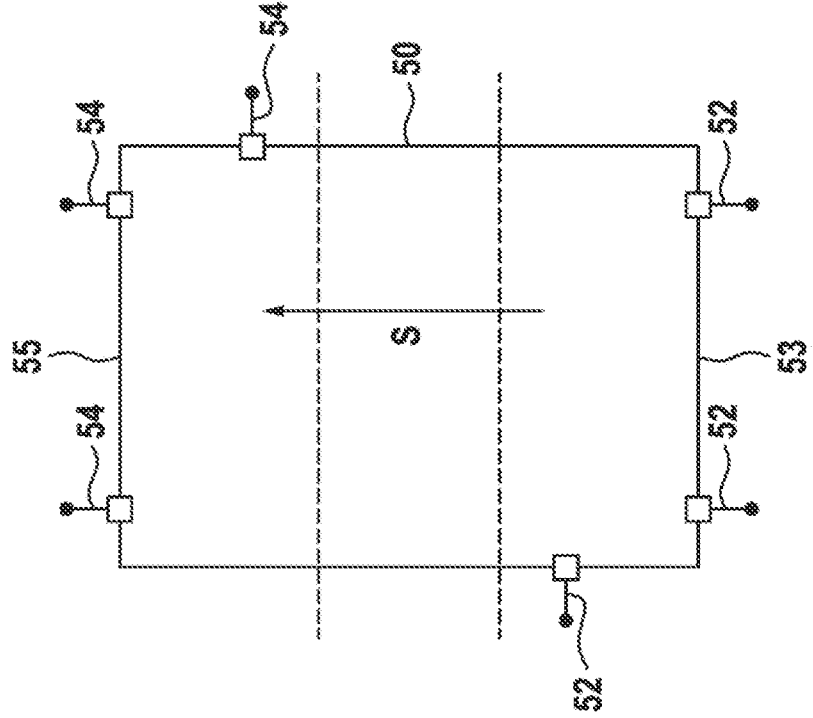
FIG. 14 shows a housing of a fuel cell system.

FIG. 14 illustrates a housing 50 of a fuel cell system 100 according to the invention, only the housing 50 having three ventilation inlets 52 and three outflow outlets 54 being illustrated in FIG. 14 for the sake of clarity. The at least one fuel cell 90 (not illustrated) according to the invention can be arranged in the housing 50. The two dotted lines divide the housing 50 into three thirds, namely into a lower third, a middle third and an upper third. The three ventilation inlets 52 are located in the lower third, two ventilation inlets 52 being arranged on a lower end 53. The three outflow outlets 54 are located in the upper third, two outflow outlets 52 being arranged on an upper end 55. The lower third, in particular the lower end 53, is closer to the center of the earth than the upper third, in particular the upper end 55. The at least one fuel cell 90 is preferably arranged in the housing 50 in such a way that the accidentally escaping hydrogen can collect in the upper third of the housing 50 owing to its lower density relative to air. If hydrogen escapes in the lower third of a housing 50, there is a natural flow S of hydrogen from the lower third of the housing 50 in the direction of the upper third of the housing 50 since hydrogen is lighter than air. The removal of the hazardous hydrogen is particularly favorable by virtue of the arrangement of the three outflow outlets 54 in the upper third of the housing 50. In particular, the arrangement of the two outflow outlets 54 on the upper end 55 of the housing 50 assists a particularly advantageous natural removal of the hydrogen. If a fuel cell system according to the invention is installed in a vehicle, it is conceivable for a plurality of outflow outlets 54 to be arranged on the upper end 55, in particular on the edges and/or the center of the upper end 55, thus enabling the outflow fluid to flow out of the housing 50 in a particularly favorable manner via an outflow outlet 54, depending on the vehicle position. The arrangement of the three ventilation inlets 52 in the lower third of the housing can furthermore assist removal of accidentally escaping hydrogen. In particular, if hydrogen escapes in the lower third of the housing 50, the ventilation fluid can mix with the hydrogen in an improved way and flow out of an outflow outlet 54. It may be particularly advantageous if at least one ventilation inlet 52 is arranged in the lower third and at least one outflow outlet 54 is arranged in the upper third. More specifically, it is possible as a result for a ventilation fluid to flow around particularly long distances in the housing 50, many points of the housing 50 and further parts located in the housing 50, such as, for example, lines, from the at least one ventilation inlet 52 to the at least one ventilation outlet 54. Consequently, most points in the housing 50 at which hydrogen has collected and/or most points of the at least one fuel cell 90 at which hydrogen accidentally escapes are covered by the flow of the ventilation fluid. With the aid of the ventilation fluid flowing through, it is also possible for the heat generated during operation of the at least one fuel cell 90 to be removed from the at least one fuel cell 90 and/or for heated air surrounding the at least one fuel cell to be removed via the at least one outflow outlet 54. Thus, ventilation of a housing takes place in a low-cost and simple manner, and furthermore the safety of the fuel cell system is improved. However, arrangement of ventilation inlets 52 and outflow outlets 54 in the central region of the housing 50 is not excluded. Depending on the arrangement of a housing 50 of a fuel cell system 100, arrangement of the ventilation inlets 52 and outflow outlets 54 can be adapted to, for example, a body of a vehicle.

Figure 15:
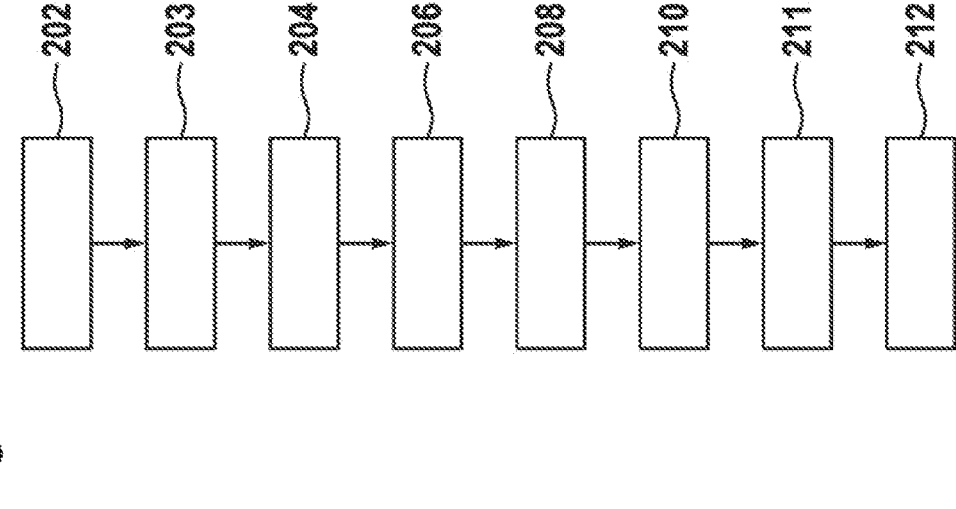
FIG. 15 shows a method for ventilating a housing of a fuel cell system.

FIG. 15 illustrates a method 200 according to the invention, wherein the supply fluid is provided 202 for the ventilation of the housing 50 by a supply fluid in a first step. This supply fluid can be provided by a first fluid source, which is, in particular, the ambient air, and can be compressed 203 by a compressor 16. Starting from the first fluid source, the supply fluid flows 204 in the supply line 14 in the direction of the fuel cell 90. A fluidly communicating ventilation line 24 between the supply line 14 and at least one ventilation inlet 52 of a housing 50 makes it possible for at least some of the supply fluid to flow 206 as ventilation fluid in the fluidly communicating ventilation line 24. This ventilation fluid flows 208 into the at least one ventilation inlet 52 of the housing 50, flows 210 through the housing 50 and mixes 211 with hydrogen to give an outflow fluid and flows 212 out as outflow fluid from the at least one outflow outlet 54 of the housing 50.

Figure 16:
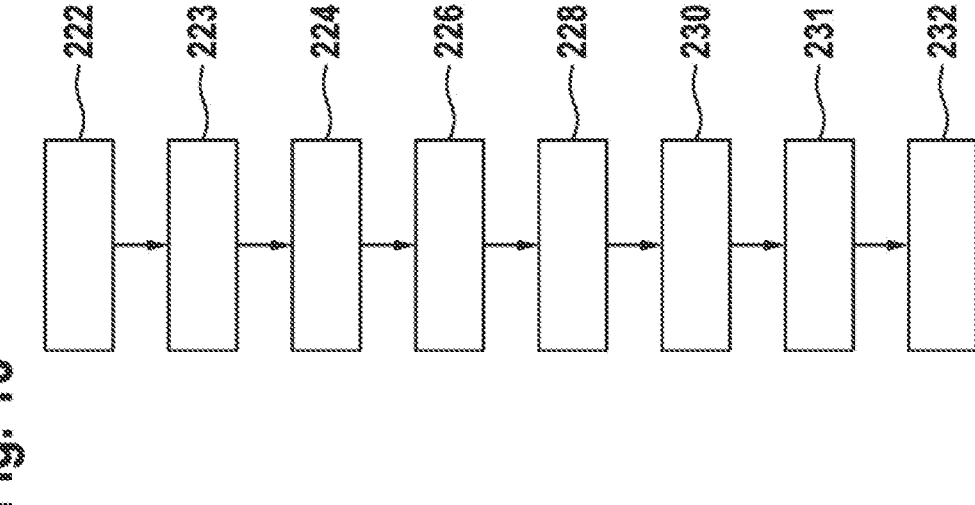
FIG. 16 shows a method for ventilating a housing of a fuel cell system.

FIG. 16 illustrates a method 200 according to the invention, wherein the cooling fluid is provided 222 for the ventilation of the housing 50 in a first step. This cooling fluid can be provided by a second fluid source, which is, in particular, the ambient air, and can be compressed 223 by a cooling fluid compressor (not illustrated). The second fluid source and the first fluid source may be the same fluid source. Starting from the second fluid source, the cooling fluid flows 224 in the compressor cooling line 32 through the compressor 16 and cools the compressor 16. A fluidly communicating compressor ventilation line 34 between the compressor cooling line 32 and at least one ventilation inlet 52 of a housing 50 makes it possible for at least some of the cooling fluid to flow 226 as ventilation fluid in the fluidly communicating compressor ventilation line 34. This ventilation fluid flows 228 into the at least one ventilation inlet 52 of the housing 50, flows 230 through the housing 50 and mixes 231 with hydrogen to give an outflow fluid and flows 232 out as outflow fluid from the at least one outflow outlet 54 of the housing 50.

The ventilation of the housing 50 by the supply fluid and/or the cooling fluid preferably takes place continuously. Furthermore, ventilation of the housing 50 under closed-loop and/or open loop control by a controller 66 is conceivable.

Figure 17:
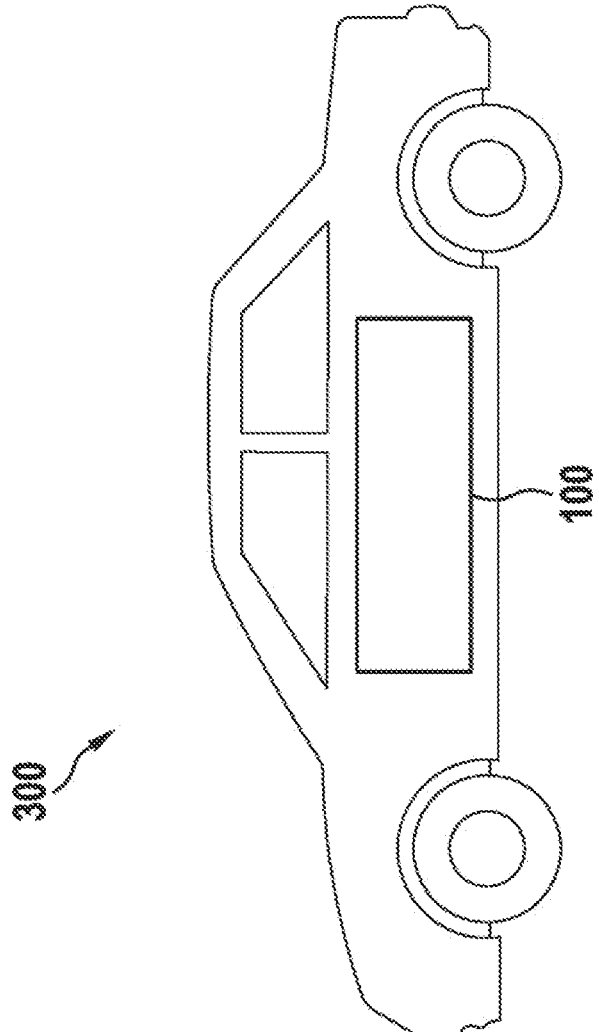
FIG. 17 shows a motor vehicle having a fuel cell system according to the invention.

FIG. 17 illustrates a motor vehicle 300 having a fuel cell system 100 according to the invention.

What is claimed is:

1. A fuel cell system (100) with
   a) at least one fuel cell (90), wherein each of the at least one fuel cell (90) has a cathode inlet (92),
   b) a housing (50), in which the at least one fuel cell (90) is arranged, wherein the housing (50) has at least one ventilation inlet (52) for inflow of at least one ventilation fluid and at least one outlet (54) for outflow of at least one outflow fluid,
   c) a supply line (14) to the cathode inlet (92) for providing a supply fluid from a first fluid source to the cathode inlet (92), and
   d) a compressor (16) in the supply line (14) for compressing the supply fluid, wherein
   the fuel cell system (100) further comprises:
   e) a fluidly communicating ventilation line (24) connecting the supply line (14) to the at least one ventilation inlet (52), wherein the fluidly communicating ventilation line (24) is configured to receive the supply fluid, wherein the fluidly communicating ventilation line (24) is connected to the supply line (14) between the compressor (16) and the cathode inlet (92), wherein a humidifier (44) is arranged in the supply line (14) between the compressor (16) and the cathode inlet (92), wherein the fluidly communicating ventilation line (24) is connected to the supply line (14) downstream of the humidifier (44).

2. The fuel cell system (100) as claimed in claim 1, wherein a heat exchanger (42) is arranged in the supply line (14) between the compressor (16) and the cathode inlet (92), and the fluidly communicating ventilation line (24) is connected to the supply line (14), which is situated between the heat exchanger (42) and the at least one fuel cell (90).

3. The fuel cell system (100) as claimed in claim 2, wherein the heat exchanger (42) is a charge-air cooler.

4. The fuel cell system (100) as claimed in claim 1, wherein the at least one ventilation inlet (52) is arranged in a lower third, in particular on a lower end (53), of the housing (50) and/or the at least one outlet (54) is arranged in an upper third, in particular on an upper end (55), of the housing (50).

5. The fuel cell system (100) as claimed in claim 1, wherein the fuel cell system (100) comprises a fluidly communicating outflow line (56) between the at least one outlet (54) and an outflow element for connecting the at least one outlet (54) to the outflow element.

6. A motor vehicle (300) having the fuel cell system (100) as claimed in claim 1.

7. The fuel cell system (100) as claimed in claim 1, further comprising a compressor cooling line (32) for cooling the compressor (16) and a fluidly communicating compressor ventilation line (34) between the compressor cooling line (32) and the at least one ventilation inlet (52) for connecting the compressor cooling line (32) to the at least one ventilation inlet (52).

8. The fuel cell system (100) as claimed in claim 7, wherein the fluidly communicating ventilation line (24) has a mass-flow sensor (46*a*) between the supply line (14) and the at least one ventilation inlet (52), and/or wherein the fluidly communicating compressor ventilation line (34) has a mass-flow sensor (46*b*) between the compressor cooling line and the at least one ventilation inlet.

9. The fuel cell system (100) as claimed in claim 7, wherein a heat exchanger (60*a*) for controlling temperature of the supply fluid is arranged in the fluidly communicating ventilation line (24), and/or a heat exchanger (60*b*) for controlling temperature of a cooling fluid is arranged in the fluidly communicating compressor ventilation line (34).

10. The fuel cell system (100) as claimed in claim 9, wherein the fluidly communicating ventilation line (24) has therein a shut-off unit (62*a*) for interrupting fluid communication between the first fluid source and the at least one ventilation inlet (52), and/or wherein the fluidly communicating compressor ventilation line (34) has a shut-off unit (62*b*) for interrupting fluid communication between a second fluid source and the at least one ventilation inlet (52).

11. The fuel cell system (100) as claimed in claim 10, wherein the heat exchanger (60*a*) in the fluidly communicating ventilation line (24) and/or the shut-off unit (62*a*) in the fluidly communicating ventilation line (24) and/or the heat exchanger (60*b*) in the fluidly communicating compressor ventilation line (34) and/or the shut-off unit (62*b*) in the fluidly communicating compressor ventilation line (34) is/are controlled by a controller (66).

12. A method (200) for ventilating a housing of the fuel cell system (100) as claimed in claim 7, wherein the method (200) has the steps of providing (202) a supply fluid compressing (203) the supply fluid by means of the compressor (16)

flow (204) of the supply fluid in the supply line (14)

flow (206) of at least some of the supply fluid as ventilation fluid in the fluidly communicating ventilation line (24)

inflow (208) of the ventilation fluid into the at least one ventilation inlet (52) of the housing (50)

flow (210) of the ventilation fluid through the housing (50) and simultaneously mixing (211) the ventilation fluid with hydrogen to give an outflow fluid, and outflow (212) of the outflow fluid from the at least one outlet (54) of the housing (50) and/or the method (200) comprises the steps of providing (222) a cooling fluid compressing (223) the cooling fluid flow (224) of the cooling fluid in the compressor cooling line (32) to cool the compressor (16)

flow (226) of at least some of the cooling fluid as ventilation fluid in the fluidly communicating compressor ventilation line (34)

inflow (228) of the ventilation fluid into the at least one ventilation inlet (52) of the housing (50)

flow (230) of the ventilation fluid through the housing (50) and simultaneously mixing (231) the ventilation fluid with hydrogen to give an outflow fluid, and outflow (232) of the outflow fluid from the at least one outlet (54) of the housing (50).

* * * * *